United States Patent
Balaban et al.

(10) Patent No.: US 8,204,836 B2
(45) Date of Patent: Jun. 19, 2012

(54) DYNAMIC DISCRETE DECISION SIMULATION SYSTEM

(75) Inventors: Carey Balaban, Pittsburgh, PA (US); Kenneth M. Sochats, Gibsonia, PA (US); Matthew Henry Kelley, Mars, PA (US); Bopaya Bidanda, Pittsburgh, PA (US); Larry J. Shuman, Pittsburgh, PA (US); Shengnan Wu, Pittsburgh, PA (US)

(73) Assignee: University of Pittsburgh-of the Commonwealth, Pittsburgh, PA (US)

( * ) Notice: Subject to any disclaimer, the term of this patent is extended or adjusted under 35 U.S.C. 154(b) by 907 days.

(21) Appl. No.: 12/112,642

(22) Filed: Apr. 30, 2008

(65) Prior Publication Data

US 2010/0100510 A1    Apr. 22, 2010

Related U.S. Application Data

(60) Provisional application No. 60/938,471, filed on May 17, 2007.

(51) Int. Cl.
| | |
|---|---|
| G06E 1/00 | (2006.01) |
| G06E 3/00 | (2006.01) |
| G06F 15/00 | (2006.01) |
| G06G 7/00 | (2006.01) |
| G06N 99/00 | (2010.01) |

(52) U.S. Cl. .................................................. 706/10
(58) Field of Classification Search ............ 706/10
See application file for complete search history.

(56) References Cited

U.S. PATENT DOCUMENTS

2009/0055150 A1 *  2/2009  Prior et al. ............. 703/11

OTHER PUBLICATIONS

Kitano, Hiroaki et al.; "RoboCup Rescue: Search and Rescue in Large-Scale Disasters as a Domain for Autonomous Agents Research"; 1999; IEEE; pp. 739-743.*
Takahashi, Tomoichi et al.; "Agent Based Approach in Disaster Rescue Simulation—From Test-Bed of Multiagent System to Practical Application -"; 2002; Springer-Verlag Berlin Heidelberg; pp. 102-111.*
Pollak, Eytan et al.; "Operational Analysis Framework for Emergency Operations Center Preparedness Training"; 2004; Proceedings of the 2004 Winter Simulation Conference; pp. 839-848.*
Wang, Dali et al.;"A GIS-enabled Distributed Simulation Framework for High-Performance Ecosystem Modeling"; 2006; ESRI International User Conference; pp. 1-7.*
Liu, Qiang et al.; "Modeling Intelligent C2 Using Technology of Multi-Agent"; 2006; Northwestern Polytechnical University Xian (China); pp. 1-8.*
Massaguer, Daniel et al.; "Multi-Agent Simulation of Disaster Response"; 2006; ACM; pp. 1-7.*

(Continued)

*Primary Examiner* — Michael B Holmes
*Assistant Examiner* — Stanley K Hill
(74) *Attorney, Agent, or Firm* — Kegler Brown Hill & Ritter; James J. Pingor

(57) ABSTRACT

A system that enables dynamic discrete decision simulation is provided. Simulation has many advantages in modeling complex systems to facilitate decision making. The innovation discloses a system that integrates an agent-based discrete event simulator, a geographic information system, a rule base, and interactive databases in addition to interfaces and other supporting components. The modules can seamlessly communicate with each other by exchanging a progression of data, and by making a series of deductive decisions through embedded algorithms. The integrated system can be applied to disaster management planning and training.

14 Claims, 21 Drawing Sheets

OTHER PUBLICATIONS

Railsback, Steven F. et al.; "Agent-based Simulation Platforms: Review and Development Recommendations"; 2006; The Society for Modeling and Simulation International; Simulation, vol. 82, Issue 9; pp. 609-623.*

Farinelli, A. et al.; "Design and Evaluation of Multi Agent Systems for Rescue Operations"; 2003; IEEE; Proceedings of the 2003 IEEE/RSJ International Conference on Intelligent Robots and Systems; pp. 3138-3143.*

* cited by examiner

Graph 1(a): Scene clearance time *vs.* number of casualties

Graph 1(b): Scene death count vs. number of casualties

DYNAMIC DISCRETE DECISION SIMULATION SYSTEM

CROSS-REFERENCE TO RELATED APPLICATIONS

This application claims the benefit of U.S. Provisional Patent application Ser. No. 60/938,471 entitled "DYNAMIC DISCRETE DISASTER DECISION SIMULATION SYSTEM" and filed May 17, 2007. The entirety of the above-noted application is incorporated by reference herein.

BACKGROUND

Large scale crises such as natural disasters, terrorism, or the like continue to be real threats to humanity. In many instances, natural disaster and terrorism events often trigger chaos which increases loss of life as well as damage to property. For instance, availability and response time of emergency personnel and services can be impaired if resources and infrastructures are not optimized for response as well as evacuation.

A 'natural disaster' refers to a consequence of a natural hazard (e.g., hurricane, tsunami, earthquake) which affects human activities. Overall vulnerability, exacerbated by the lack of planning or lack of appropriate or adequate emergency management, can lead to enhanced financial, environmental and human losses. The resulting loss is often a function of the ability of the population to support or resist the effects of the disaster. For example, crisis response procedures are often implemented to assist emergency personnel and services to address crisis situations.

One of the most notable natural disasters was a Category 5 hurricane, Hurricane Katrina, which made landfall on the north-central Gulf Coast on Aug. 28, 2005. This hurricane was one of the strongest, costliest and one of the five deadliest hurricanes in United States (U.S.) history. The most severe loss of life and property damage occurred in New Orleans, La., which flooded as the levee system catastrophically failed as a result of the storm. In addition to the damage and loss of life that occurred in Louisiana, Katrina caused severe destruction across the entire Mississippi coast and into Alabama. Overall, the destruction spanned as far as 100 miles from the storm's center.

In Louisiana, the federal flood protection system in New Orleans reportedly failed in more than fifty places. Nearly every levee in metro New Orleans breached as Hurricane Katrina passed east of the city, subsequently flooding 80% of the city and many areas of neighboring parishes for weeks. As a result of Hurricane Katrina, at least 1,836 people lost their lives, making it the deadliest U.S. hurricane of recent times. In addition to the loss of life, the storm is estimated to have been responsible for over $80 billion in damage, making it the costliest natural disaster in United States history.

As a result of this storm, criticism as well as blame has been projected upon many individuals, groups and governmental agencies with respect to emergency response performance and procedures. Particularly, there was widespread criticism of the federal, state and local governments' reaction to the storm, which ultimately resulted in an investigation by the U.S. Congress. Essentially, many believe that if a more organized and expeditious response was triggered, the death toll as well as property damage could have been minimized.

In addition to natural disasters, today, terrorism has become a viable and growing threat to humanity. In the modern sense, 'terrorism' refers to violence against civilians most often to achieve political or ideological objectives by establishing fear in innocent victims. Terrorism includes those acts which are intended to create fear, are perpetrated for an ideological goal rather than to an isolated attack, and which deliberately target or disregard the safety of civilians. Additionally, terrorism is sometimes described as a form of unconventional warfare and/or psychological warfare. Historically, terrorism has been used by a broad array of political organizations in furthering their objectives or agendas. Organizations that employ terrorism to further their objective include, but are not limited to, political parties, religious groups, revolutionaries, governments, among others.

One of the most notable acts of terrorism was the attack on the World Trade Center in New York City. This attack, which occurred on Sep. 11, 2001, involved a series of coordinated suicide strikes upon the U.S. by an organized terrorist group, namely, al-Qaeda. On the morning of September 11, nineteen al-Qaeda terrorists hijacked four commercial passenger jet airliners. The hijackers, some of which had flight training, intentionally crashed two of the airliners into the twin towers of the World Trade Center. These crashes resulted in the collapse of both buildings soon afterward as well as extensive damage to nearby buildings. The hijackers crashed a third airliner into the Pentagon in Arlington County, Virginia. Passengers aboard a fourth hijacked airliner attempted to regain control of their plane from the hijackers. Tragically, the fourth plane crashed into a field in Somerset County, Pennsylvania, killing all passengers as well as the hijackers.

As a result of these acts of terrorism, in addition to the 19 hijackers, 2,974 people died as an immediate result of the attacks with another 24 missing and presumed dead. Therefore, the number of immediate victims totaled 2,998, the overwhelming majority of whom were civilians. As was the case with Hurricane Katrina, the response to the event was scrutinized, analyzed and questioned with respect to effectiveness and adequacy. Overall, the response to the collapse of the buildings was viewed as satisfactory or even better. However, with more efficient organization, response policies and procedures, the overall response to the tragedy might have been even more effective.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a dynamic discrete decision simulation system. The system can assist in crisis (e.g., disaster) management thereby assisting in efficient uses of resources. The simulation enables training as well as real-time (or near real-time) situation or crisis management.

In aspects, the innovation can assist crisis (e.g., disaster) response organizations to simulate and/or improve the management of regional (and national) emergency assets and operations. Essentially, the innovation interfaces an agent-based, discrete event simulator with both a geographic information system (GIS) and a rule base (e.g., standard policies and protocols for various event responses). The architecture of the system enables modules (or agents) to dynamically and intelligently "talk" to each other by exchanging real-time (or near real-time) data and making intelligent deductions.

In particular aspects, the integrated system can be designed to accurately mimic real-world disaster response scenarios. The system can be used to assess how various configurations of emergency resources and operating policies might impact the effectiveness of responses to various large-scale incidents.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
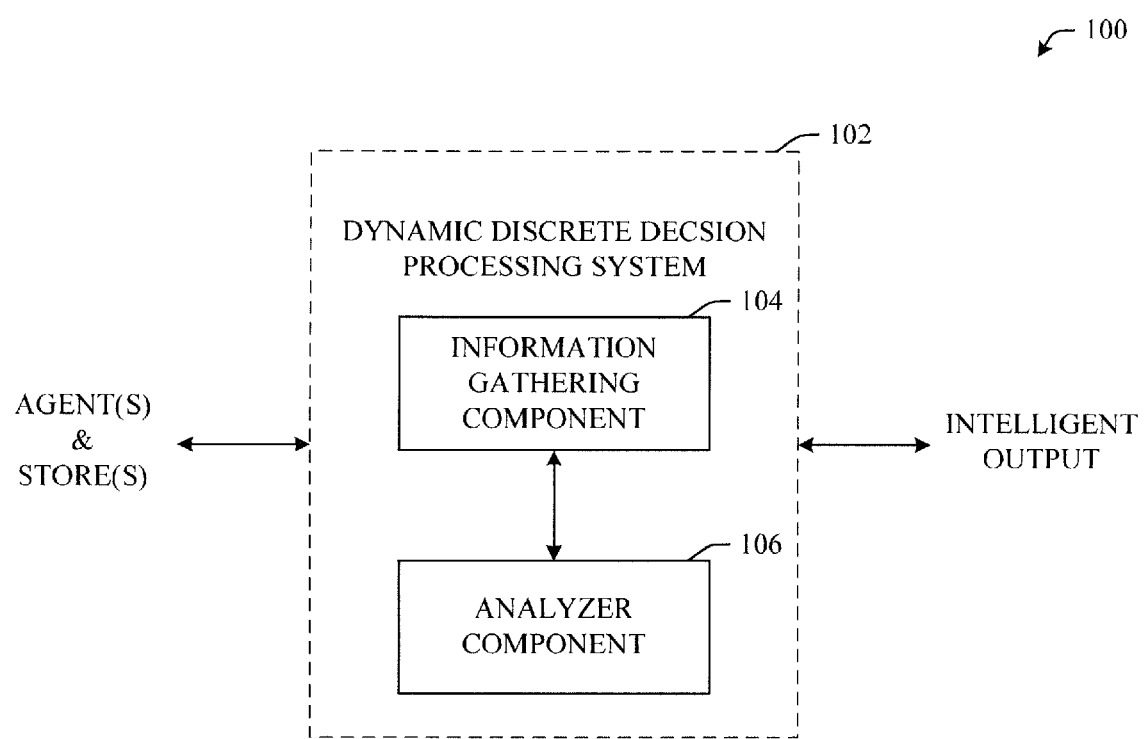
FIG. 1 illustrates a system that facilitates dynamic discrete decision-based simulation in accordance with an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component," "agent," "module," "engine," and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

While certain ways of displaying information to users are shown and described with respect to certain figures as screenshots, those skilled in the relevant art will recognize that various other alternatives can be employed. The terms "screen," "web page," and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

Referring initially to the drawings, FIG. 1 illustrates a system 100 that facilitates dynamic decision-based simulation in accordance with aspects of the innovation. As will be understood upon a review of the figures and discussion that follows, the decision-based simulation can be driven by pre-defined rules/policies, dynamically-defined rules/policies and/or inference-based rules/policies. Each of these scenarios will be described in greater detail in accordance with the figures that follow.

While many of the examples are directed to terrorism event management, it is to be understood that most any event or situation can be addressed in accordance with the features, functions and benefits of the herein disclosed systems (and corresponding methodologies). Accordingly, it is to be understood that these alternative aspects are to be included within the scope of this disclosure and claims appended hereto. For example, the innovation can be applied to terrorism, natural disasters, human-caused disasters, as well as other crises regardless of impact, type and/or size.

Generally, system 100 can include a dynamic discrete decision processing system 102 that employs information from agents and stores to establish an intelligent output. More particularly, the processing system 102 can include an information gathering component 104 and an analyzer component 106 that together can access information, evaluate the information and establish a dynamic simulation of the situation which sets forth parameters such as response services, personnel, casualties, property damage, etc. As well, the innovation enables future projection of the situation based upon rules, policies and/or inferences.

The threat of terrorism activities combined with the recent large scale natural disasters have prompted the innovation which effectively includes comprehensive decision making tools that can enable responsible personnel to be prepared to respond to these potential events. It is to be understood that, being prepared implies being able to respond to a large scale disaster (or crisis) while simultaneous dealing with the area's ongoing emergency incidents.

From a modeling perspective, it will be understood that the innovation is a very complex system 100. The innovation employs simulation techniques to model and analyze these complex systems using computer technology. Simulation can outperform mathematically modeling in such instances because of its capability to get around stringent assumptions that must be made for analytical models to be tractable. Further, stand-alone, hard-coded systems might work well in restricted scenarios but they cannot capture the dynamic nature of the real systems.

Accordingly, the system 100 is a flexible, dynamic and realistic simulation-based system which can be employed in crisis (or situational) management planning, response and training. As described in greater detail below, the system 100 can use discrete event simulation (DES) as a primary system modeler and evaluator, feeding progressive data into it to make the simulation model and decision making process dynamic. In addition to a simulator, other agents (e.g., components) of system 100 can include a geographic information system (GIS), a rule base (e.g., decision model), relational databases and a client interface. The system 100 is also scalable enabling other supporting agents and components to be introduced in a realistic fashion.

In addition to building system 100, two other accomplishments of the innovation are: (1) to seamlessly integrate the different module components into one platform to realistically simulate the actual disaster (or situational) management process; and (2) to develop and then combine rule generation algorithms and simulation optimization methodologies into the system 100 to better understand emergency response operations and improve disaster management.

Natural disasters and terrorist attacks are crises that compel urgent coordinated responses by state and local agencies, among others. These events present a challenge to first responders, who must react to unfamiliar scenarios in a decisive manner to minimize the impact on life and property. These events present an equally, if not greater, challenge to a state's governing authorities, who must efficiently coordinate the efforts of numerous response agencies; both horizontally among agencies and vertically between local and state agencies. State leaders must also efficiently and effectively allocate federal assistance when it becomes available. The broad range of possible crises only increases the potential burden on state governments to recognize the nature, stage, and scale of an event and respond quickly and appropriately. Without the appropriate tools and training, a danger always exists that state-level leaders may unwittingly exacerbate rather than mitigate the damage. Emergency response has often been characterized as a 'wicked' problem where the type, size, scale, location, victims and many other parameters are outside the control of the responders.

Further compounding the complexities of response are the realities of the environment in which the response must take place. This is most evident in a city, for example Pittsburgh, Pa., where the capacity to respond is further shaped by topography, rivers, bridges, tunnels and other characteristics of the region. System 100 is capable of considering these variables to prove an intelligent and dynamic simulation of events in a crisis management scenario. For example, the innovation dynamically considers contextual factors in determining and simulating effects of a situation. While many aspects described herein focus upon emergency response and preparedness, it is to be understood that the features, functions and benefits of the innovation can have wider applicability in areas such as: urban and regional planning, military operations, etc. These alternative aspects are to be included within the scope of the innovation and claims appended hereto.

Figure 2:
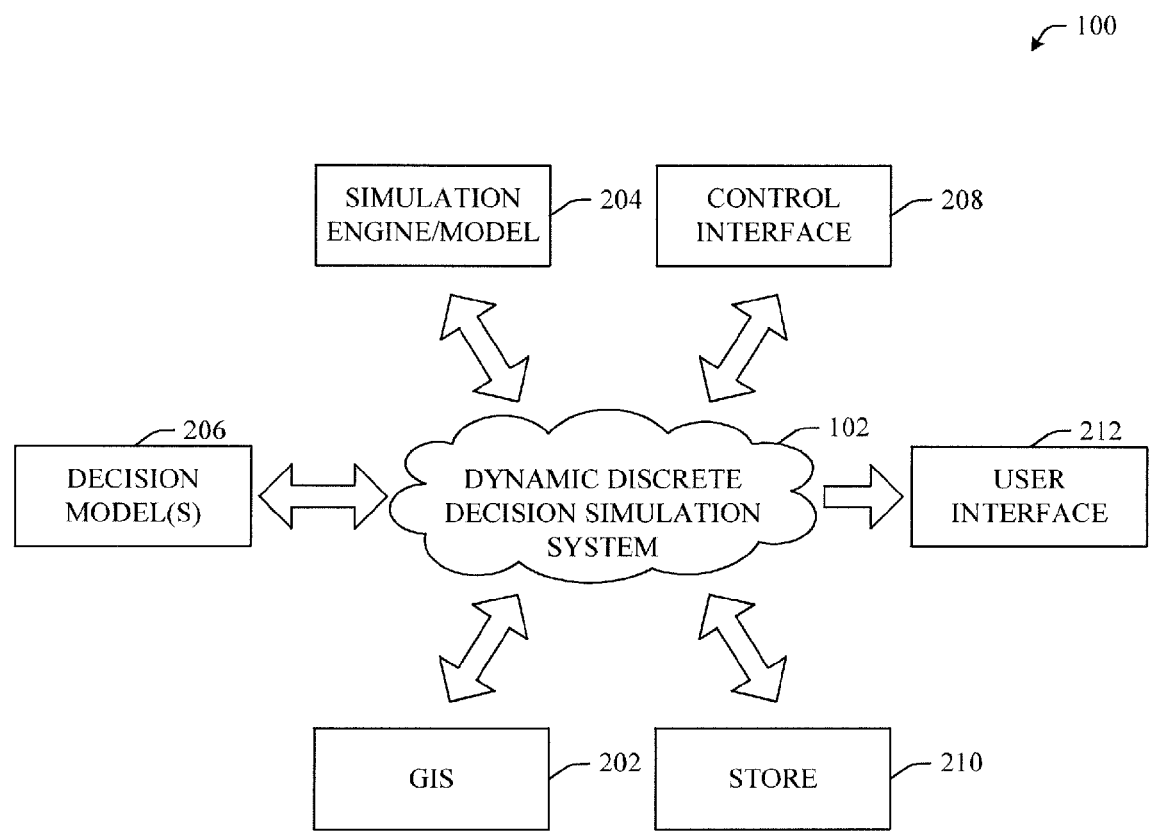
FIG. 2 illustrates an alternative component view of a system that facilitates dynamic discrete decision simulation in accordance with an aspect of the innovation.

As shown in FIG. 2, the system 100 can seamlessly integrate a geographic information system (GIS) 202, discrete event simulation 204, a rule-based decision modeling system 206 and a control interface 208 that can mirror an emergency operations center. The model's geo-database 210 can include layers (e.g., over 100 layers) of geographic, asset and other geo-referenced information. The simulation model 204 can be built dynamically from the geo-database (210) and situational data about the event which allows creation of most any number, type and size of emergency events. The decision model 206 can include rules that codify standards, training, best practices, exercises and research on first responders, emergency managers, dispatchers, the public, terrorists, other actors and environmental factors.

Each component of system 100 can dynamically inform and interact with the others continuously of decisions, status changes, and other situational variables that have changed as the event(s) unfold. This interaction and reactive awareness can be facilitated by way of the information gathering and analysis subcomponents (104, 106) as illustrated in FIG. 1. It will be understood that the model provides a circumstance independent laboratory for testing how the type and scale of an event, situational variables and command decisions affect responders' efficiency and effectiveness in dealing with disasters. In operation, the situational simulation can be provided to an entity by way of a user interface 212.

As will be understood, among others, the innovation can be employed for planning, training and management. With regard to planning, the system 100 enables measurement of the effectiveness of policies and procedures as well as optimization of routing, procedures and resource allocation. Training benefits include that ability to allow users to step forward and retrace the simulation process. This simulation can provide for operational definition for situational awareness. Finally, the innovation provides real time emergency management support and offline research, simulation and optimization. Each of these areas will be better understood upon a review of the figures that follow.

The dynamic discrete decision simulation system 102 integrates the components and provides interfaces for control and interaction of the overall system 100. In operation, the GIS 202, Simulation 204, Decision Models 206 and the Control Interface 208 can continuously (e.g., dynamically) interact with each other. When a crisis or simulated emergency event occurs, data from the GIS 202 may be used to generate a simulation whose results trigger some decision rules which then may update the GIS and simulation and so on.

GIS 202 plays at least two important roles in the system. First it is used as a resource for extracting the emergency assets available, for example, the victims and assets affected and the 'connectivity' of the area. Second, GIS 202 provides an excellent mechanism for portraying the current state of the emergency, what the response community often refers to as 'situational awareness.' It is to be understood that this information can be captured in real-time (or near real-time) as well as inputted manually in disparate aspects of the innovation.

Figure 3:
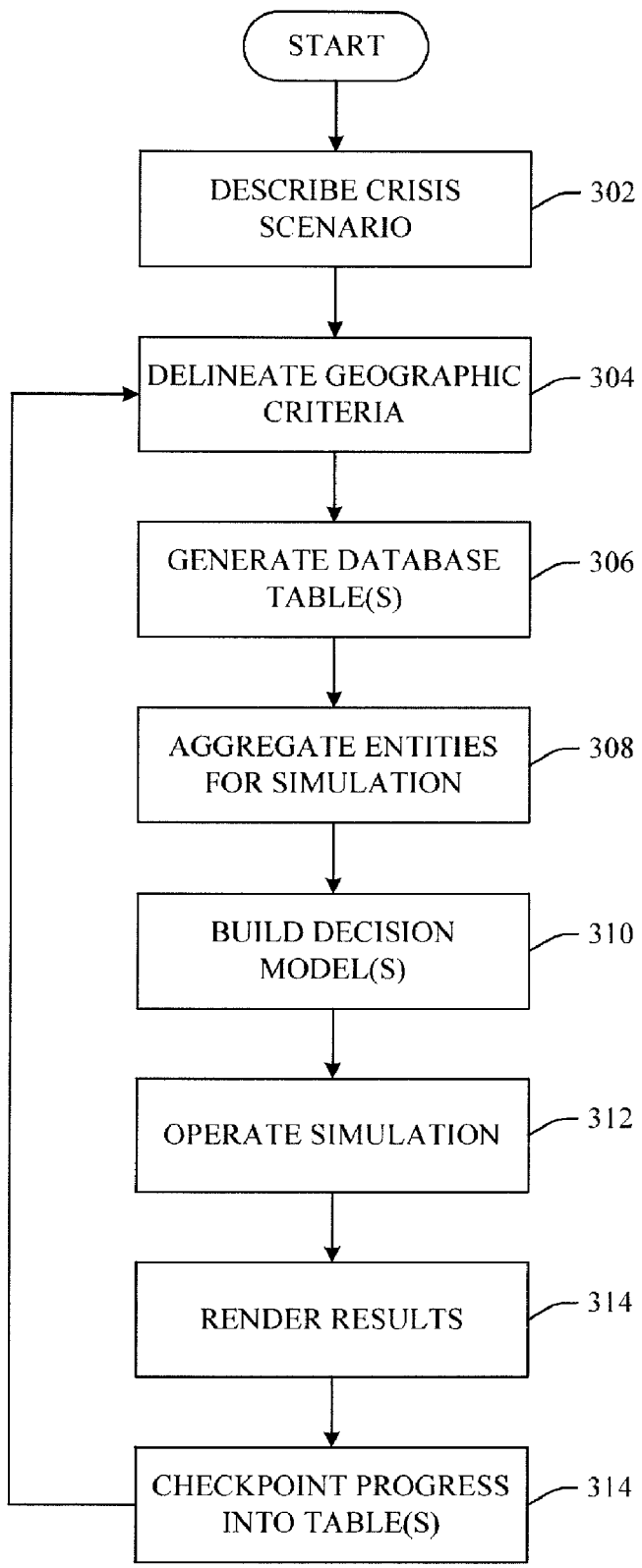
FIG. 3 illustrates an example flow chart of procedures that facilitate dynamic simulation of an event in accordance with an aspect of the innovation.

FIG. 3 illustrates a methodology of monitoring and simulating an event or crisis in accordance with an aspect of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 302, a user or entity can manually (or automatically) describe a disaster scenario. In aspects, uniform descriptions and guidelines can be employed, for example governmental standards such as the Department of Homeland Security standard disaster scenarios. The innovation can also utilize governmental standards and metrics for measuring consequences. In one aspect, control interface 208 can be employed to define the crisis.

Geographic criteria can be delineated at 304. For example, using GIS, the system can delineate the geographic scope of the disaster and extract the relevant geographic features, transportation routes, buildings, population and other important entities. GIS can also be used to provide network solutions (e.g., shortest route, spanning tree).

Database tables that describe relevant entities and their attributes can be established at 306. At 308, the appropriate aggregation of these entities is created for simulation and decision support. Decision models are built and the simulation operation is effected at 310 and 312 respectively.

Once established, the results are rendered at 314. For instance, the results the results of the simulation/decision process can be dynamically displayed via a user interface (e.g., 212 of FIG. 2). Examples of a rendering include, but are not limited to a map display, a dashboard display, etc. The dynamic features of the methodology can be illustrated by the checkpoint of progress act at 314. Here, the simulation/decision progress can be checkpointed into a database table. In one aspect, this act can interrupt the simulation, e.g., use the partial results as boundary conditions for new simulation that 'zoom-ins'. Additionally, as a dynamic feature of the system, as shown, the methodology can return to 304 to delineate additional geographic criteria.

Figure 4:
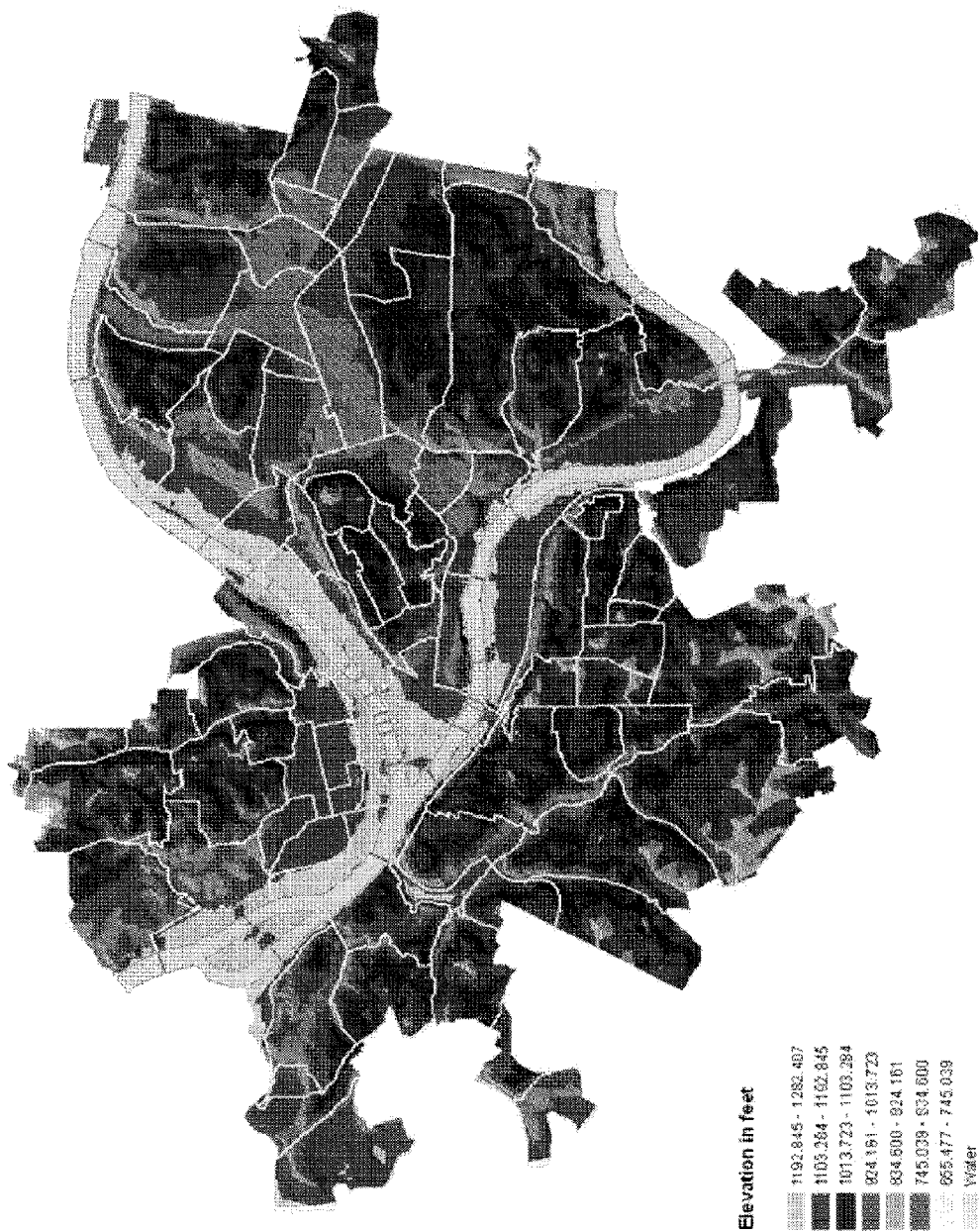
FIG. 4 illustrates an example topology map in accordance with an aspect of the innovation.

As described above, while specific aspects are included and described herein, it is to be understood that these examples are provided merely to add perspective to the innovation and not to limit the innovation in any manner. FIG. 4 illustrates an example topology map that illustrates rivers, bridges, tunnels and other characteristics of the Pittsburgh region. Each of these characteristics can be considered and analyzed in establishing a comprehensive and dynamic simulation of an event. This topology will be utilized in describing an example throughout this disclosure.

Figure 5:
FIG. 5 illustrates an example map that illustrates an area view that corresponds with the topology of FIG. 4.

One key feature of the system 100 is an ability to dynamically build a network simulation model (204 of FIG. 2). FIG. 5 illustrates a map that displays an area view of downtown Pittsburgh. As shown, the information gathering component 104 together with the analysis component 106 are capable of extracting (and labeling) key nodes (intersections) as candidates for the simulation. In the case from which this diagram was extracted, a hazardous chemical train wreck was hypothesized at node 1.

Figure 6:
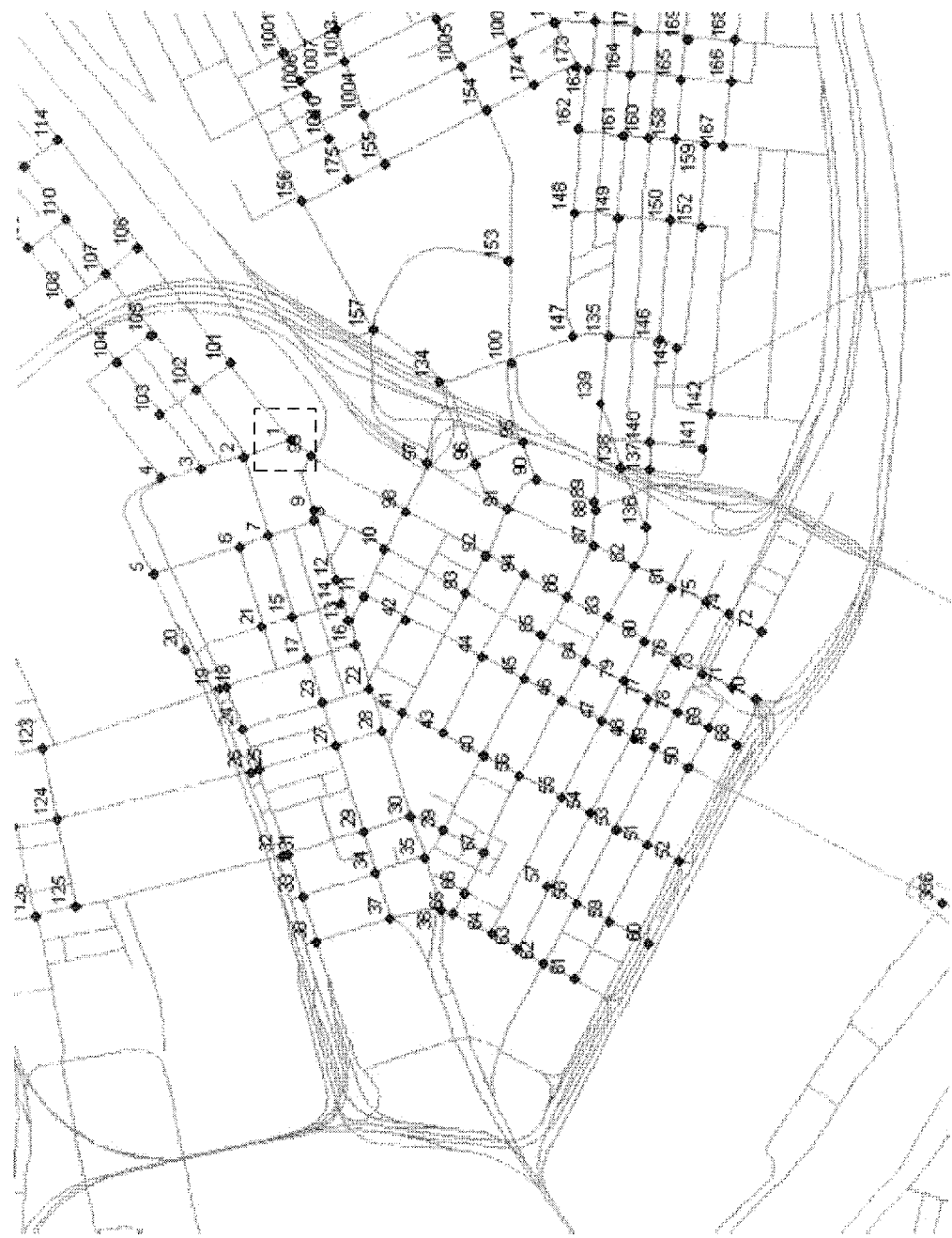
FIG. 6 illustrates an example focused view of an affected area from the example map of FIG. 5.
Figure 7:
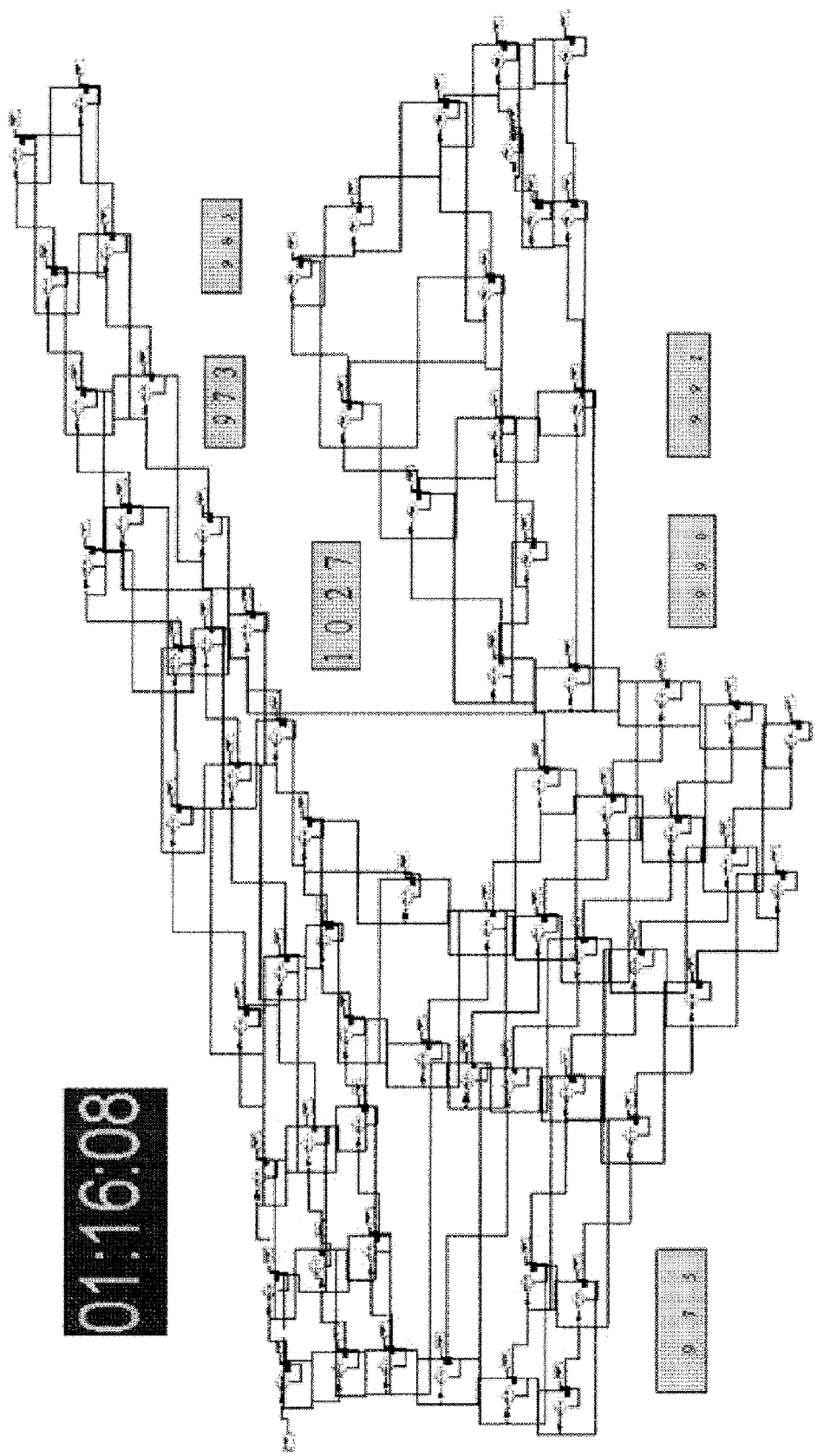
FIG. 7 illustrates a schematic of a model that corresponds with the focused view of FIG. 6.

A 'zoomed-in' or magnified version of the hypothesized affected area is shown in FIG. 6. In operation, the innovation can construct a queuing based simulation model (204) of the affected area. A schematic of such a model is shown in FIG. 7. In this example, the simulation model (204) is designed to simulate the evacuation of victims out of the affected area, the deployment of emergency services such as emergency medical services (EMS), fire, police, hazmat, etc., as well as the transportation of casualties to appropriate treatment facilities.

Turning now to a discussion of decision models (206 of FIG. 2), in one aspect a decision model (206) can be based on standard rule-based reasoning from artificial intelligence (AI) or other machine learning & reasoning logic (MLR). In other aspects, pre-programmed rules, policies, regulations etc. can be employed. In this aspect, the decision modeler is unique in that it uses a standard SQL database management system to store and retrieve the rules. While this aspect employs an SQL database management system to store and retrieve the rules, it will be understood that other aspects can employ other database management systems without departing from the spirit and scope of the innovation and claims appended hereto. The database management system can allow for creation of a very large rule base and can provide an interface consistent with the other system modules.

While alternative rule formats can be employed, in accordance with the example aspect, a rule format is disclosed that allows specification of the rule and relation of the rules to rule sets, actor's charges with execution of the rules. Tagging the rules with identifications (IDs) and warrants allows identification of the origin of the rule and creation of 'explanation' when, and if, necessary. Rule executions can be catalogued in a database table to allow backtracking.

Rule Format

<Condition1><Condition2>...:<Consequence1><Consequence2>...
{Actor}{Probability}{Warrant}{Risk}{ID}

Example

<IncidentType "Chemical Spill">:  <Dispatch Fire><Dispatch HazMat>
<Dispatch Police><AreaStrategy Evacuate>...{Actor Commander}{P 1.00}
{Warrant NIMS(1.25)}{Risk 1.3 7.4}{27}

In this example, rules are grouped into rule sets as a result of their derivation. Sources of rule sets are:

1. Standards—NIMS, NFPA, FEMA, etc.
2. Subject Matter Experts—Police, fire, EMS, Hazmat, etc.
3. Best Practices
4. Emergency Plans
5. Other oral or written policies, procedures or practices.

Rules can be triggered when the state of the overall system (100), GIS (202), simulation (204), or user input changes. In operation, rules can change the state of the system, e.g., GIS—rearranging assets, simulation—changing parameters, or by changing or firing other rules.

Figure 8:
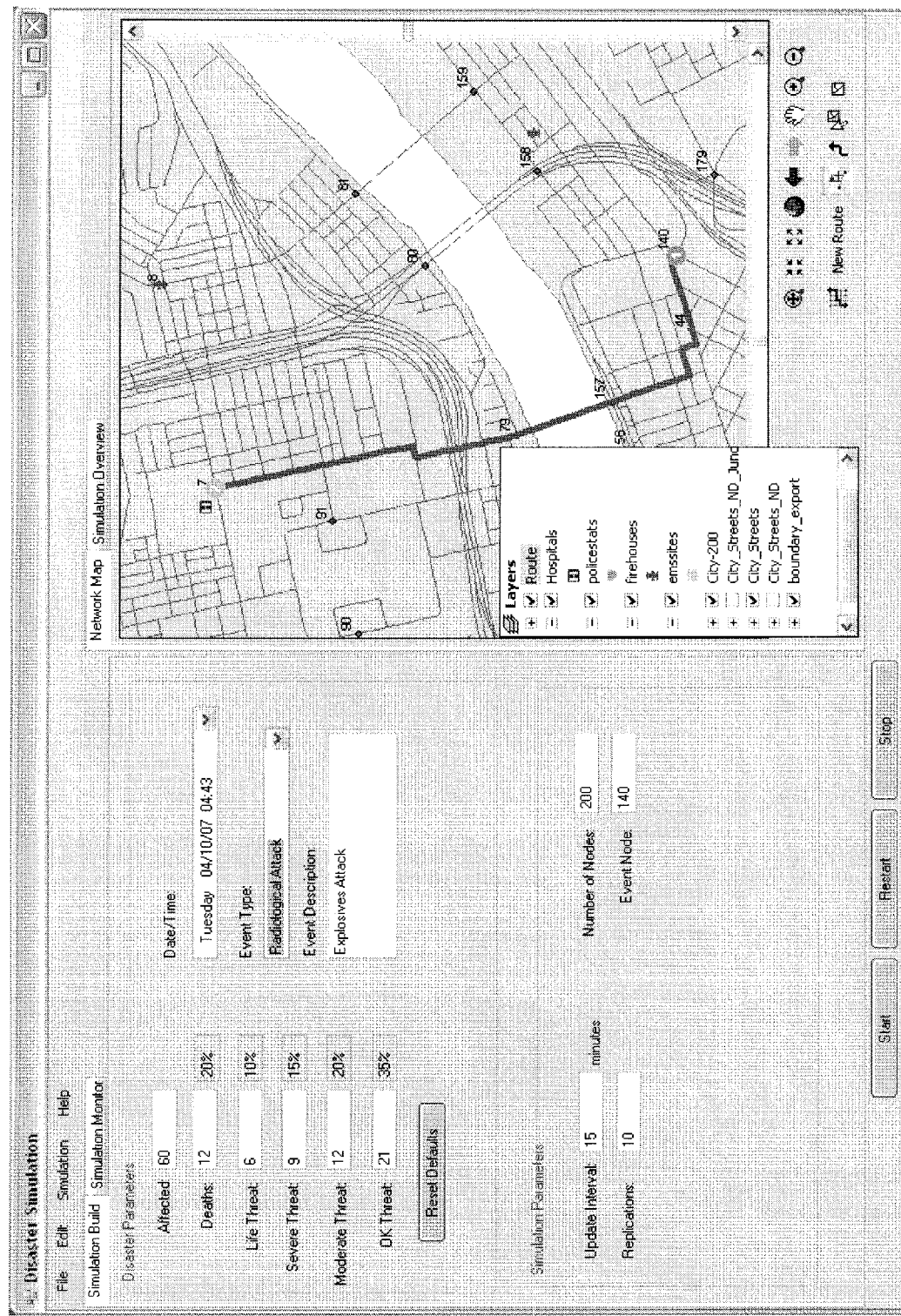
FIG. 8 illustrates an example control interface screen in accordance with an aspect of the innovation.

Much of essence of innovation as discussed supra is transparent to the user. This section describes the operation of the system from the user's perspective. More particularly, following is a discussion of the simulation control interface (208 of FIG. 2). In an aspect, designed as an expert system, the interface 208 enables emergency management for personnel and researchers. An example of a control interface 208 in accordance with the innovation is illustrated in FIG. 8.

The control interface 208 has at least two primary modes. The first mode can be described as the interface that assists a user while in the process of constructing a simulation. This mode refers to control interface 208 of FIG. 2. Results output to a user refer to interface 212. It is to be understood that interfaces 208 and 212 can be collocated in a single component or separate as appropriate or desired. This is when the "Simulation Build" and "Network Nap" tabs are active as shown in FIG. 8. The second mode refers to the interface 212 features that enable the users to review and analyze the simulation results (Simulation Monitor and Simulation Overview tabs active).

Constructing a simulation most often includes at least two primary functions. The first function is to set parameters that describe the actual disaster (or event). The second refers to generation of a network with which to run the simulation. Below is an example list of parameters and their descriptions that can be set via the interface 208:

Date/Time—Date and time of day that the event takes place to account for traffic, daylight, resource availability, weekend and holiday adjustments;

Event Type—Disaster event types, for example, fifteen disaster event types as defined by the United States Department of Homeland Security;

Update Interval—Elapsed time, e.g., number of minutes, between each data capture by the system for analysis;

Affected—Number of people affected by the disaster;

Replication—Number of times the simulation will run;

Event Node—Location of the event; and

Number of Nodes—Number of nodes with which to run the simulation.

Parameter adjustments which are made during the build process impact many areas throughout the simulation including dispatch rules, resource allocation, travel times, protocols, casualty distribution, etc. Casualty distribution (e.g., deaths, life threat, severe threat, minor/moderate threat) can be a function of the event type, although, the distribution can be further adjusted after the event type is designated.

As illustrated in the example of FIG. 8, embedding functionality from a geographic information system (GIS) (202) (e.g., an ESRI (Environmental Systems Research Institute) ArcEngine version 9.2 in a NET form) allows the interface 208 to render an interactive map. Following is a description of an example process to generate a simulation network. Using the map a user selects an area with which to conduct the simulation. Interface tools allow users to add/remove response resources, critical nodes, damaged infrastructure, traffic congestion hotspots, etc.

Once configured, the simulation process can be started by pressing the Start button (or other designated trigger). An additional process can be employed to build the network into a usable network from the components selected with the interface's interactive map. In this process, a network optimization algorithm constructs the node set, connections, and travel rates for the simulation engine (204) (e.g., Rockwell-brand Arena version 10).

Figure 9:
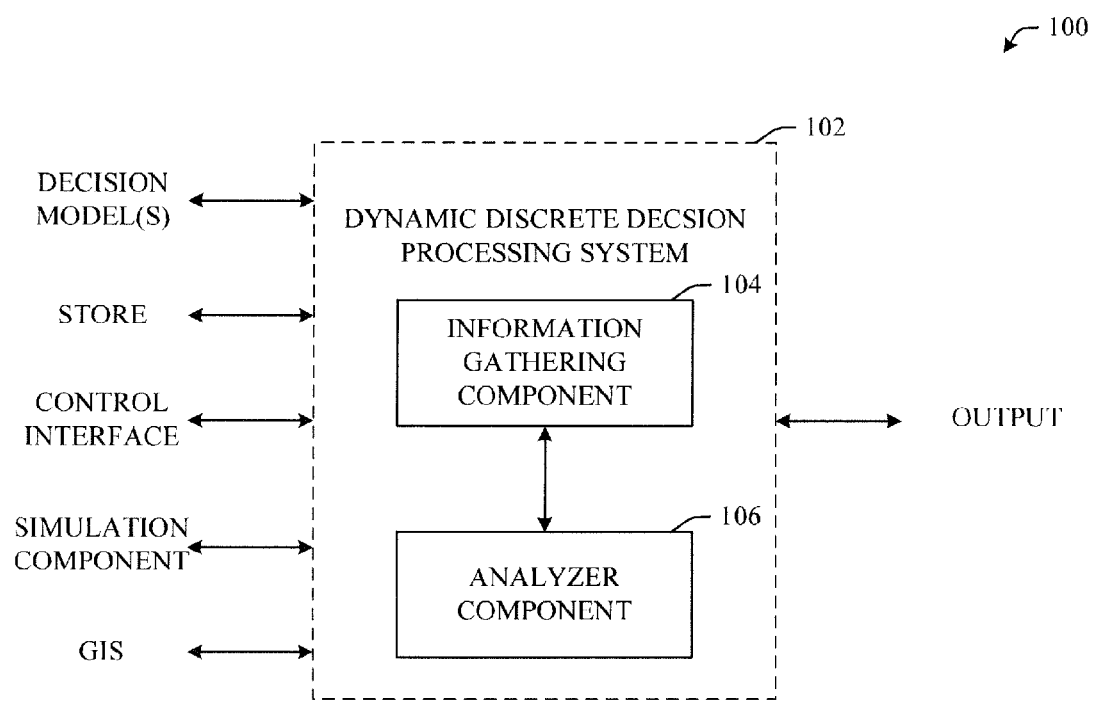
FIG. 9 illustrates an alternative block diagram of a dynamic decision-based simulation system in accordance with an aspect of the innovation.

FIG. 9 illustrates an alternative block diagram of system 100. As described earlier, the information gathering component 104 is capable of gathering information related to a subject simulation of an event. Accordingly, the analyzer component 106 can evaluate the information thereby enabling the processing system 102 to generate a user output (e.g., via interface 212).

Figure 10:
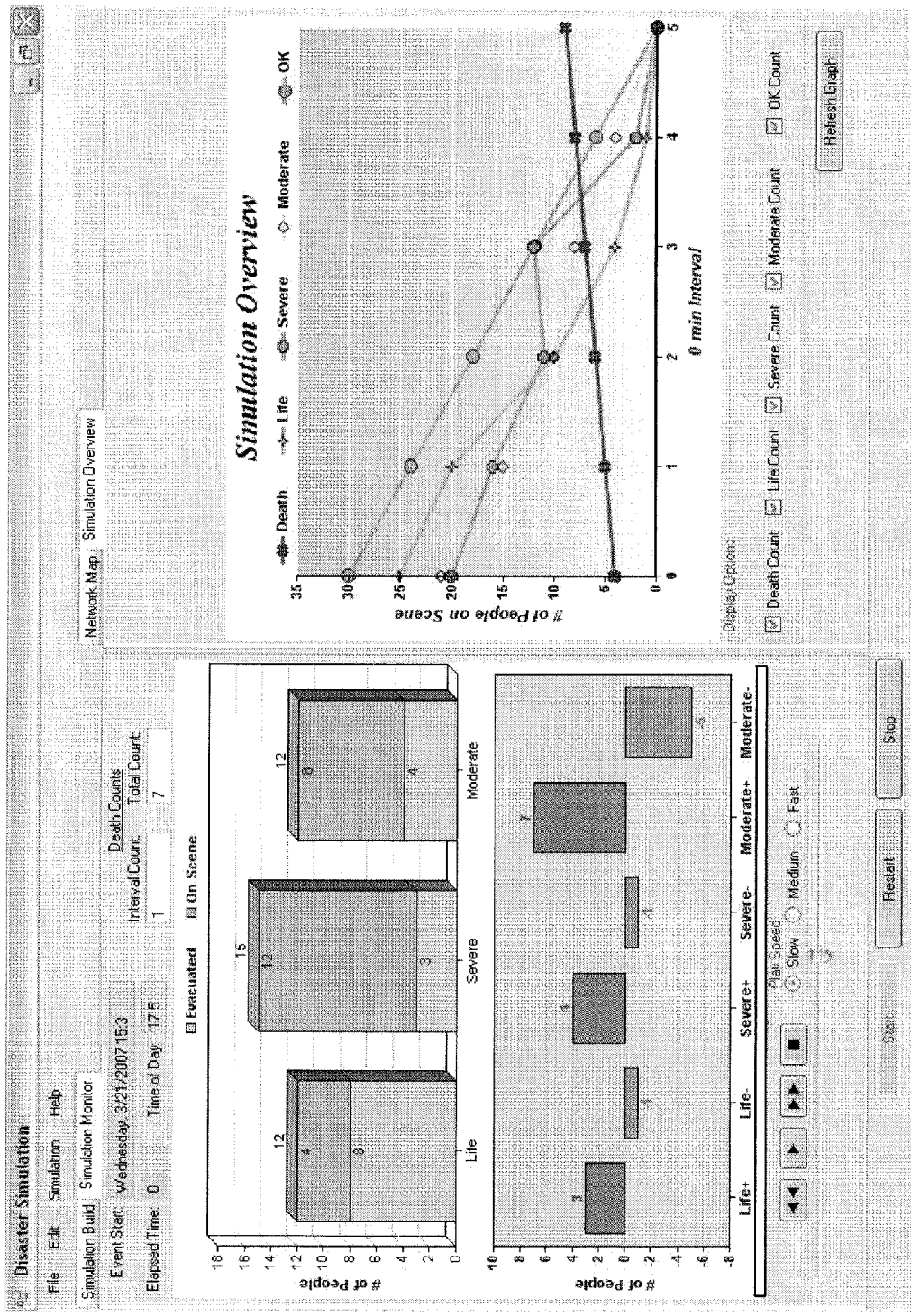
FIG. 10 illustrates an example user interface screen in accordance with an aspect of the innovation.

In operation, the analyzer component 106 triggers after the Start (or triggering) button is pressed and the simulation completes. FIG. 10 illustrates an example interface (212) that depicts an example simulation overview in accordance with an aspect of the innovation.

The example tabs illustrated in FIG. 10 contain both information about the simulation as a whole (e.g., Simulation Overview tab) and details at each of the designated time intervals. The simulation overview chart shows the total number of people remaining at the scene over each time interval. Multiple lines on the chart further delineate the people at the scene by threat type. Users can customize the chart by selecting and/or deselecting various threat type check boxes and pressing the appropriate trigger, e.g., Refresh Graph.

Figure 11:
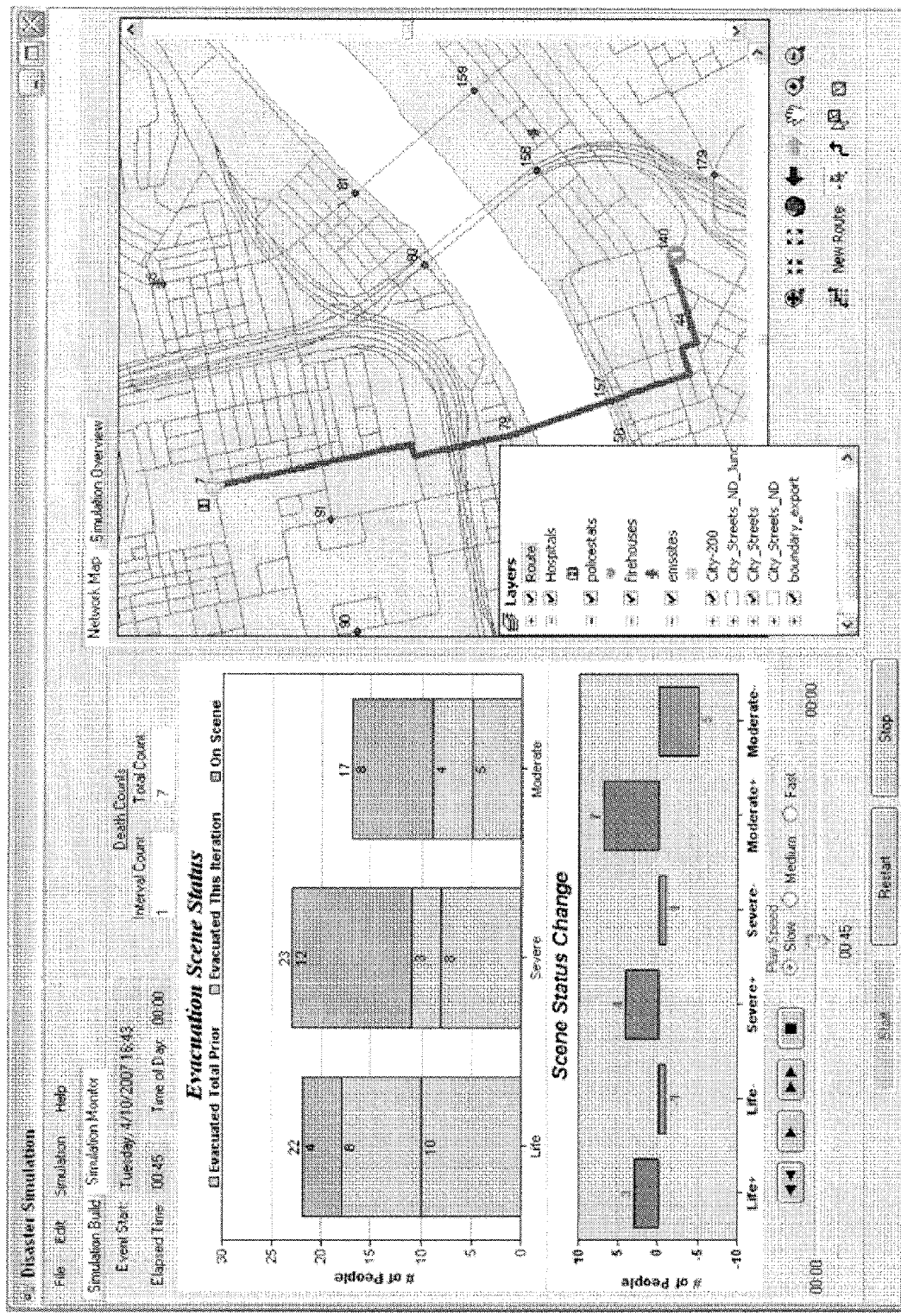
FIG. 11 illustrates an example user interface screen in accordance with an aspect of the innovation.

While the example user interface screens shown herein depict examples of analysis tools, it is to be appreciated that other examples exist which illustrate the features, functions and benefits of the innovation and claims appended hereto. In the example illustrated in FIG. 11, a double stacked chart shows results at each time interval. The top chart contains information about what evacuations took place in an interval as well as the total evacuations up to that time.

Green represents the total number of people evacuated (by threat type) prior to the latest group of evacuees Orange represents the to number of people evacuated (by threat type) during the latest time interval Red represents the number of people (by threat type) that are remaining at the scene to be evacuated Built into the simulation process are health degradation and improvement curves that capture movement between threat types. For instance, throughout the response, citizens and responders themselves might become injured and be moved from the 'OK' status to minor/moderate status. Effects of the degradation and improvement curves can be seen on the bottom chart of FIG. 11. Once every life, severe, and minor/moderate threat casualty has been evacuated the simulation ends. Users can replay the simulation, in the form of an animation, at various speeds by selecting a play speed and pressing on the Play button via the interface 212.

Users can also re-run a simulation after adjusting parameters or generating a new network, e.g., by repeating the process described herein. Additional functionality is available, such as loading existing simulations, viewing an 'Arena' animation, viewing hospital/route usage maps and exporting the resulting data. It is to be understood that data is also available in the database used for the simulation.

The innovation can be employed to create a 'topology' of response for a city. This analysis can identify areas that have poor response characteristics. As well, the simulation can identify and map bottleneck intersections in response to a crisis. Similarly, alternative routing plans can be explored and simulated. Simulations can be reused to model other events, for example, similar events. Still further, it is to be understood that the innovation can employ real-time (or near real-time) sensor data to model actual events and progress related thereto.

As described above, the innovation can assist crisis (e.g., disaster) response organizations to simulate and/or improve the management of regional (and national) emergency assets and operations. Essentially, the innovation interfaces an agent-based, discrete event simulator with both a geographic information system (GIS) and a rule base (e.g., standard policies and protocols for various event responses). The architecture of the system 100 enables modules (or agents) to dynamically "talk" to each other by exchanging real-time data and making intelligent deductions. This integrated system 100 is designed to accurately mimic real-world disaster response scenarios. The system 100 can be used to assess how various configurations of emergency resources and operating policies might impact the effectiveness of responses to various large-scale incidents.

Disasters (e.g., natural disasters, terrorism) are one of the major barriers to the sustainable development of society. Recently, the United States has observed both large-scale natural and man-made disasters that have had great impacts on major cities. For example, the catastrophe caused by Hurricane Katrina in New Orleans in 2005 destroyed key aspects of that city including much of its assets, while greatly diminishing its population and economy. Of the city's 180,000 structures, 125,000 were flooded. One year later New Orleans population remained reduced by nearly 60% according to the New York Times. The mismanagement of Katrina responses cost more than $100 billion and over 1,300 lives. Clearly, the threat to lives is huge in densely populated urban areas where structures, facilities and people are concentrated. For a large-scale disaster, even a small delay in responding can result in many more casualties and an enhanced loss of property.

Generally, disasters can be categorized into two major categories: natural events and technological events. Different disasters have distinct characteristics in terms of scale, complexity and treatment, therefore, they require responders to act differently according to each specific situation. How to respond to a disaster appropriately is a major challenge for emergency decision makers, e.g., incident managers.

While emergency commanders are typically well-trained and have good knowledge of how to respond to the various kinds of disasters, each incident is an ad-hoc event that requires special attention so that unthinkable situations do not emerge. For example, the September 11 (aka 9/11) terrorism attack in New York City is different from the Hurricane Katrina in New Orleans and required different responses. Effective disaster decisions are based upon a significant amount of information and knowledge of the event. However, the complexity of real-world events, knowledge and experience, when combined with a limited capability for processing information, are not sufficient for disaster management to precisely predict how future situations might arise and evolve. Decision makers could be left behind evolving events due to their limitations so that their decisions might actually delay the initiation of more appropriate responses. In contrast, a computer-based, seamlessly-integrated simulation, information sharing and decision making system could be used as a tool to comprehensively process information and make decisions on allocating current resources and dispatching first responders in an efficient manner—the innovation described herein discloses such a dynamic simulation-based system.

While the innovation has been described above, following is yet another description of an example system architecture and work flow of systems (and corresponding methodologies) in accordance with aspects of the innovation. In accordance with the innovation, discrete event simulation (DES) is employed to model complex, large-scale systems and to evaluate their performances. DES is often preferred to other approaches (e.g., mathematical programming formulations) because it can fully capture both the stochastic and dynamic nature of such systems. When a large-scale incident occurs, the scene could be extremely chaotic, for example, because of excessive congestion caused by both the responders and injured or panicked people. Accordingly, it is extremely hard to model such a stochastic, dynamic system mathematically. However, it is possible to simulate it with operational rules and logic as described herein. Further, simulation can eliminate many of the assumptions needed for mathematical programming formulations and allows for modeling of the system more realistically. With simulation, more accurate results can be obtained which are critical for informed disaster decisions.

In accordance with the innovation, with reference again to FIG. 2, an automated system 102 can incorporate an agent-based discrete event simulator 204, a geographic information system (GIS) 202, a rule base 206, interactive databases 210, and other supporting components. The modules are designed to intelligently "talk" to each other by exchanging real-time (or near real-time) data and making deductions through embedded algorithms and logic. This implementation can realize the idea of evolutionarily generating optimal or semi-optimal operational decisions based upon the progression of the events.

The simulation environment is a core component but not the only piece of the disaster decision support system. One particular challenge is the integration of the discrete event simulation with other real-time information systems to facilitate the synergic decision making process. Traditionally, simulation has been primarily a system evaluation tool, not used for making real-time (or near real-time) decisions. One feature of the innovation is to break this limitation and extend simulation for use as an evolutionary decision driver and optimizer. It is to be understood that 'evolutionary' is meant to refer to situations where a decision is not always static after it is made. In other words, the decision can be changed in order to optimize or otherwise enhance the overall performance as time elapses and the event evolves. The proposed integrated system will work in an iterative manner to reason out the proper decisions for disaster management. An example rule-driven simulation system flow chart is depicted in FIG. 12 in accordance with an aspect of the innovation.

Figure 12:
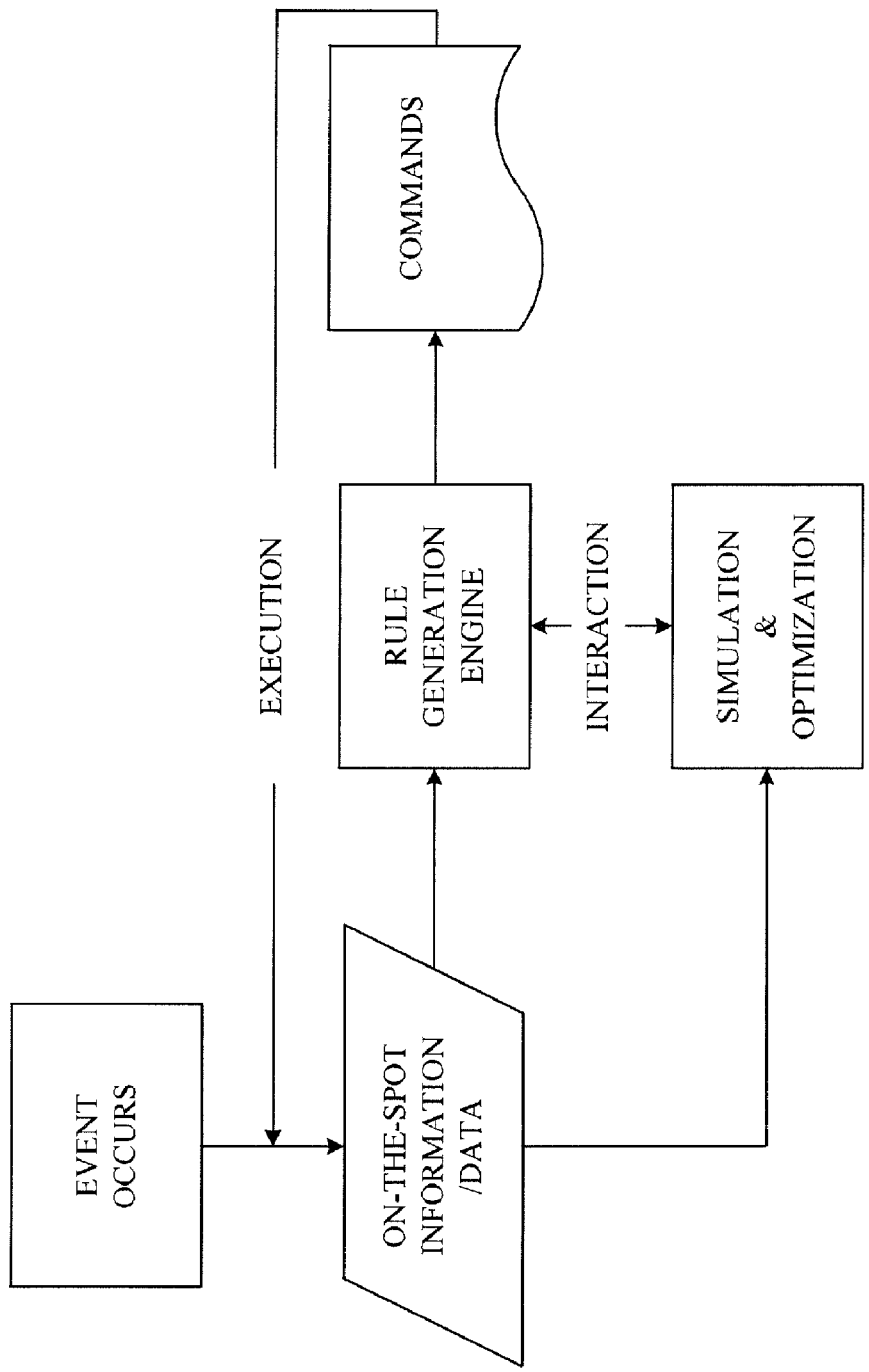
FIG. 12 illustrates an example work flow of a disaster decision support system in accordance with an aspect of the innovation.

FIG. 12 illustrates an example basic work flow of the disaster decision support system 100 in accordance with aspects of the innovation. When an event occurs, certain on-the-spot data (e.g., number of victims, type of event) are reported. The data quality can affect the system's performance significantly. In other words, the more credible the data input, the better the decisions that are later made will be. The data are then transmitted to a "Rule Generation Engine" and "Simulation and Optimization" module, respectively. The rule generation engine can initiate some basic rules, prompt responses to the disaster or event based upon the initial report of the event and send the response rules (e.g., decision model) to the simulation and optimization component.

The simulator will be dynamically informed of the updated data and operational rules which are generated as the system runs. Conversely, the simulation results will feedback to the rule generation module to assist the engine in developing better decisions. It is believed that the rule-based system can develop better conclusions if it has more accurate and adequate information input. Mathematical and statistical optimization techniques can also be incorporated into the simulation module to improve the performance of rules from the rule generation engine. For example, the rule-based system may create only general rules such as sending Emergency Medical Services (EMS) ambulances to the scene, but it may not specify the optimal rule parameters such as the number of ambulances that should be dispatched. In this sense, optimization can add specificity to the general rules, making the rules more operational.

The dynamic interaction between the rule generation process and the simulation/optimization module is one key function of the whole decision system. Accordingly, it is important to establish careful calibration before it is actually used for real-world problem solving. In the subject system, the simulation is not only a static system evaluator but also a dynamic decision driver. After several iterations, an operable plan can be produced by the rule engine, then justified and sent by the incident commanders, and executed by the emergency personnel to respond to the event. It is to be understood that a new cycle of the system flow will start by updating the on-the-spot data.

Figure 13:
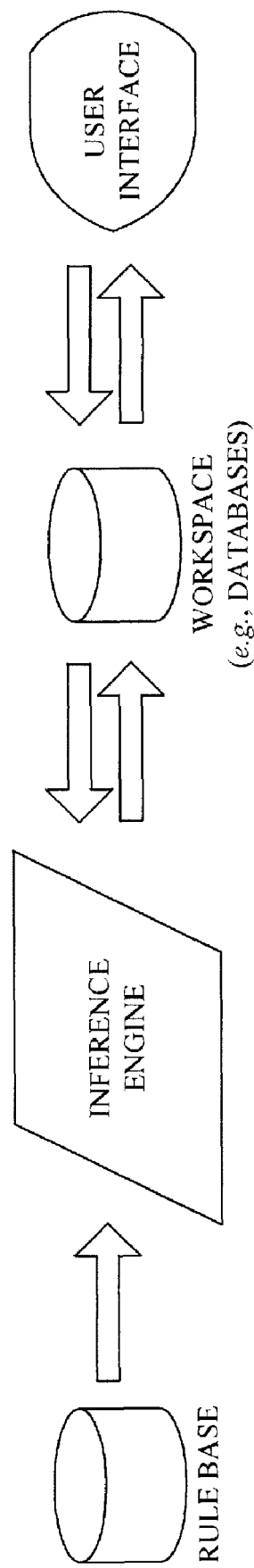
FIG. 13 illustrates an example rules-based architecture system in accordance with an aspect of the innovation.

As described above, one feature of the innovation is the evolutionary rule generation process. The innovation proposes use of a rule-based system (also called knowledge-based system) to simulate the decision making process for emergency responders and incident commanders. The system is scalable and flexible in order to respond to changes in rule sets and to serve as a test bed for different types of future incidents. Normally, a rule-based system consists of a rule base with permanent data, a workspace or working memory with temporary data, and an inference engine. As described with reference to FIG. 2, a user-friendly interface can be added to help decision makers interact with the system and improve the reasoning process. An example rules-based system architecture is depicted in FIG. 13.

The knowledge used by first responders, incident managers and other decision makers is stored as pieces of rules in the rule base. More precise rules can cause the system to generate better outcomes. Rules can be implemented in the format of "what-if" clauses: IF some condition(s) THEN some action(s). It will be understood that the clauses can be expanded by attaching attributes, for example, as the probability of certain consequences if the plan is implemented.

The workspace is a collection of databases that store the temporary fact data about the system. The data comes from the simulation, rule bases and other integrated applications such as the geographic information system (GIS). The simulator, rule bases, GIS, and other components will update the databases "on the fly" as the event evolves. The inference engine can determine how to pick and apply appropriate rules to the working memory and execute the rules. The execution of a rule may change the facts in the workspace immediately or after a while triggering other rules. In such an evolutionary manner, the time-dependent rules are generated and executed. The user interfaces can visualize the evolving situation and the decisions, and also facilitate human decision makers to interact with the system. Enabling the human experts to track the system's progress can help them identify unrealistic or defective rules and improve the disaster decision making process.

One unique feature of the innovation is that the rules generated by the system and the progressive situations depend on each other. In other words, a rule or decision model can be initiated by changing situations (e.g., upon an analysis) and the situation can be changed by new rules. If the simulated outcome is not favorable, the simulation clock can be adjusted retroactively for a time interval, for example, one hour. Accordingly, different rules can be applied until the overall outcome is satisfactory or acceptable. A sample dispatching rule set and its structure are as follows:

At 0:00, send <# of object(s)> from <base(s) #> to the scene.
At 1:00, send <# of object(s)> from <base(s) #> to the scene.
At 2:00, send <# of object(s)> from <base(s) #> to the scene.

In a more intelligent system, the rule updating interval can be flexible. For instance, the rules can be updated based upon determination or inference rather than a fixed update.

As described herein and illustrated in FIG. 2 described supra, the innovation discloses an agent-based discrete event modeling system. In aspects, the innovation employs the concept of agents to model real-world intelligent entities. As used herein, a computer 'agent' is defined as an autonomously controlled entity or component (hardware, software or a combination thereof) that can perceive its own operations as well as the surrounding environment, compile predefined rules to make operational decisions, infer new rules (e.g., MLR) and act based on these decisions. As shown in FIG. 2, the agent-based model includes a collection of such autonomous agents.

One reason that the agent-based model can simulate complex, dynamic systems is because their operations are highly analogous. Based on this rationale, the innovation incorporates the agent-based model into the discrete event simulator to simulate the behavior of the responders to the various disaster (or crisis) scenarios. The responders can be regarded as rational agents that operate by rules in order to achieve a common goal and outcomes for their actions.

Every responder agent is capable of executing and changing its actions based upon its own status, the status of other agents and/or the overall system state, all of which can be regulated by a set of action rules (e.g., pre-determined and/or inferred). In other words, the responders can be instructed as to the next action to take and how to respond to the event by the commands or their own judgments authorized (or inferred) by the rules.

Figure 14:
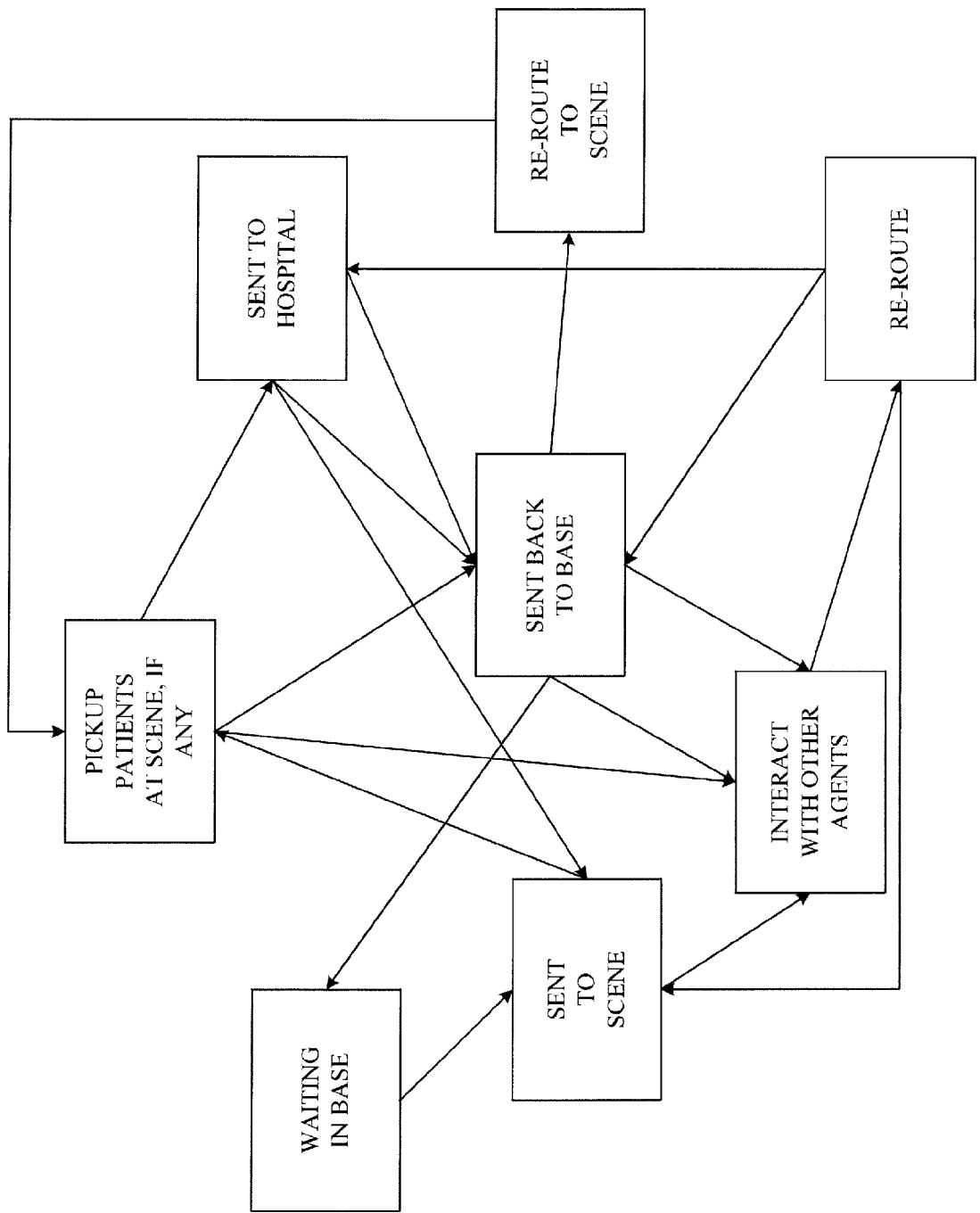
FIG. 14 illustrates example agent interactions in accordance with an aspect of the innovation.

An example of agent actions and interactions of an EMS ambulance are depicted in FIG. 14. As illustrated, an ambulance waiting in base can be called off to the scene and respond to emergency. Upon arrival at the scene, it will pick up patients, if any, and then go to drop the patients at a hospital. After the mission, the ambulance can return to base. The flow is as: "waiting in base"→"sent to scene"→"pick up patients at scene, if any"→"sent to a hospital"→"sent back to base"→"waiting in base".

As illustrated in FIG. 14, the ambulance agent's actions and interactions with other entities are defined by a set of ambulance dispatch and operation rules. Other responding agents such as emergency vehicles and evacuation vehicles can be built in a similar manner in the simulation system. For example, other emergency vehicles modeled and simulated by the innovation can include fire trucks, police cars, hazmat trucks, etc. Additionally, evacuation vehicles can include helicopters, public buses and private-sector transits that can be temporarily recruited as victim transportation tools during emergency.

In this example, the responding vehicles are modeled as individual agents to facilitate their semi-autonomous decision making process during the simulation run, based upon a set of preset operational rules. A number of different types of moving agents can be built into the system 100. It will be understood that different attributes and operational rules may apply to the various types of agents. For example, an ambulance may need to travel back and forth between the scene and hospitals, continuously transporting patients while a fire truck and the firefighters will stay at the scene to stabilize the situation.

The agent's attributes assist in definition of each vehicles operational status. To enable the dynamic status changes, all of the defining attributes should be parameterized to quantitative variables and maintained by databases. Some of the attribute values are fixed while many others are variable and updated as the simulated event evolves. The agents' status is critical information for decision makers to observe their behavior and develop response plans (e.g., real-time or near real-time plans). Besides the designated vehicles, other relevant objects such as emergency assets (e.g., fire hydrants, medical suppliers) and city infrastructure (e.g., streets, bridges) are also tagged by their defining attributes. These objects are as important as the emergency vehicles in the process of decision making. Some of the object definitions are listed in Table 1 below.

TABLE 1

Sample of object definitions for agent-based model

| Object | Attributes | Properties | Sources | Values |
|---|---|---|---|---|
| Vehicle | Vehicle ID | Fixed (Read-only) | Predefined in simulation | Integer ID |
|  | Vehicle Type | Fixed (Read-only) | Predefined in GIS | Integer ID |
|  | Trip Start Node | Dynamic | Simulation and rule sets | Node ID |
|  | Trip End Node | Dynamic | Simulation and rule sets | Node ID |
|  | *Last Action* | Dynamic | Simulation and rule sets | Encoded integer |
|  | *Current Action* | Dynamic | Simulation and rule sets | Encoded integer |
|  | *Next Action* | Dynamic | Simulation and rule sets | Encoded integer |
|  | Action Parameter | Dynamic | Simulation and rule sets | Integer |
|  | Queuing Priority | Dynamic | Rule sets | Integer |
| Street | Street ID | Fixed (Read-only) | Predefined in GIS | Integer ID |
|  | Connectivity | Fixed (Read-only) | GIS | Node ID |
|  | Lane No | Fixed (Read-only) | GIS | Integer |
|  | Speed Limit | Fixed (Read-only) | GIS | Integer |
|  | Condition | Dynamic | GIS | Encoded integer |
|  | Congestion | Dynamic | GIS and simulation | Floating-point |

In the example simulation system, all of the agents' attributes and discrete events can be encoded numerically mainly because computers understand quantitative numbers. Whenever an agent performs an action, a simulation time delay will be imposed on that agent and its action attributes (defined in italics in Table 1), for example, will be updated at the same time. In order to track the agent's behaviors, all the possible actions are encoded into computer-readable numbers. Conversely, such codes can be easily decoded to provide more informative data to human decision makers. Some of the vehicle actions are encoded as shown in Table 2.

TABLE 2

Sample of vehicle action codes for agent-based model

| Vehicle Agent | Numerical Codes | Action/Task Description |
|---|---|---|
| EMS Ambulance | 500 | At base waiting for call |
|  | 501 | At base called and processed (delay) |
|  | 502 | Travel Base-Scene |
|  | 503 | Travel Hosp-Scene |
|  | 504 | Pick up LT at Scene |
|  | 505 | Travel Scene-Hosp |
|  | 506 | Drop off LT at Hospital |
|  | 507 | Travel Scene-Base |
|  | 508 | Hosp prepare after drop-off |
|  | 509 | Travel Hosp-Base |
| Field Hospital | 1400 | At base waiting for call |
|  | 1401 | At base called and processed |
|  | 1402 | Travel Base-Spot |
|  | 1403 | Stay at FH spot and operate. |
|  | 1404 | Setup FH at spot. |

As described above, the instructional rules and knowledge for the agents are coded in the format of "what-if" clauses supported by the simulation. In this manner, the program can simulate human thought processes. In other aspects, MLR and AI mechanisms can be employed to act on behalf of an individual. When an entity finishes one action, it will "think" about what to do next. The processes of the system will be executed to facilitate the "thinking" process, analogous to a human's thought process. With the modeling schemes described herein, each responding entity can be constructed as a rational agent whose behaviors will be instructed by the integrated rules and applications.

Essentially, the innovation discloses a proposed dynamic simulation-based decision system that achieves making decisions based on realistic models for various crisis scenarios. In the system, the major, pertinent geography-related objects can be stored in a GIS. These objects include structures, transportation routes, resources, population distribution, and so forth. In the core simulator, responders are built as moving entities whose actions are regulated by standard protocols or specific decision rules.

Under normal conditions, the entities behave subject to the system constraints. In some crisis situations, for example, disasters, the entities can be governed by additional ad-hoc rules and constraints. Such ad-hoc rules and constraints are determined (and inferred) dynamically by monitoring criteria such as commanders' decisions, responders' involvement, and other objects' behaviors. It will be understood that, by using a validated simulation system, decision makers are able to predict the effects of various critical decisions before actually implementing them at the scene.

The system 100 can help detect inappropriate management decisions early to avoid worsening the situation. In this approach, the responses can be revised whenever necessary based on the simulation feedback as the event evolves. Traditionally, discrete event simulation is a tool for analyzing and evaluating a complex system's operations. In this dynamic decision system, DES is used in an innovative manner, essentially as a decision driver.

While examples are directed to disaster response, it is to be understood that the integrated system 100 has variety of crisis and other situational applications. While aspects apply to use of the features, functions and benefits by municipal governments to manage the urban large-scale disasters, the innovation can also be applied in military base management and the broader homeland security arenas, among others. Essentially, the innovation provides decision makers with an active laboratory to test policies, training, strategy and tactics in a simulated real-world decision scenario.

Small- and mid-scale civilian incidents (e.g., ordinary fires or traffic accidents that involve only a few casualties) most often require limited resources. Thus, these incidents are most often easy to control as they are manageable by standards handbooks, codes and protocols for emergency management such as NFPA 1561 (standard on Emergency Services Incident Management System). Responding to large-scale emergency incidents most often require much more careful planning and professional execution because the available responding resources are easily overwhelmed. Operations research (OR) methodologies can be helpful in evaluating the emergency plans and guiding the operations with regard to large-scale incidents including natural disasters and human-caused events.

As described herein, simulation models can compensate for the disadvantages of analytical models and can work around many of the unrealistic assumptions required for analytical models. The simulation of the innovation is particularly useful in modeling complex systems with many interactions because it carries the stochastic, dynamic nature of real systems.

As illustrated in FIG. 2, the system 100 employs several module components integrated on one platform for dynamically and realistically mimicking (and/or monitoring) various disaster and other situational incidents. In the example of FIG. 2, a simulator 204, a GIS 202, a client interface 212 and a store 210 (e.g., relational database) can be linked together to perform some basic functions of the system 100.

Figure 15:
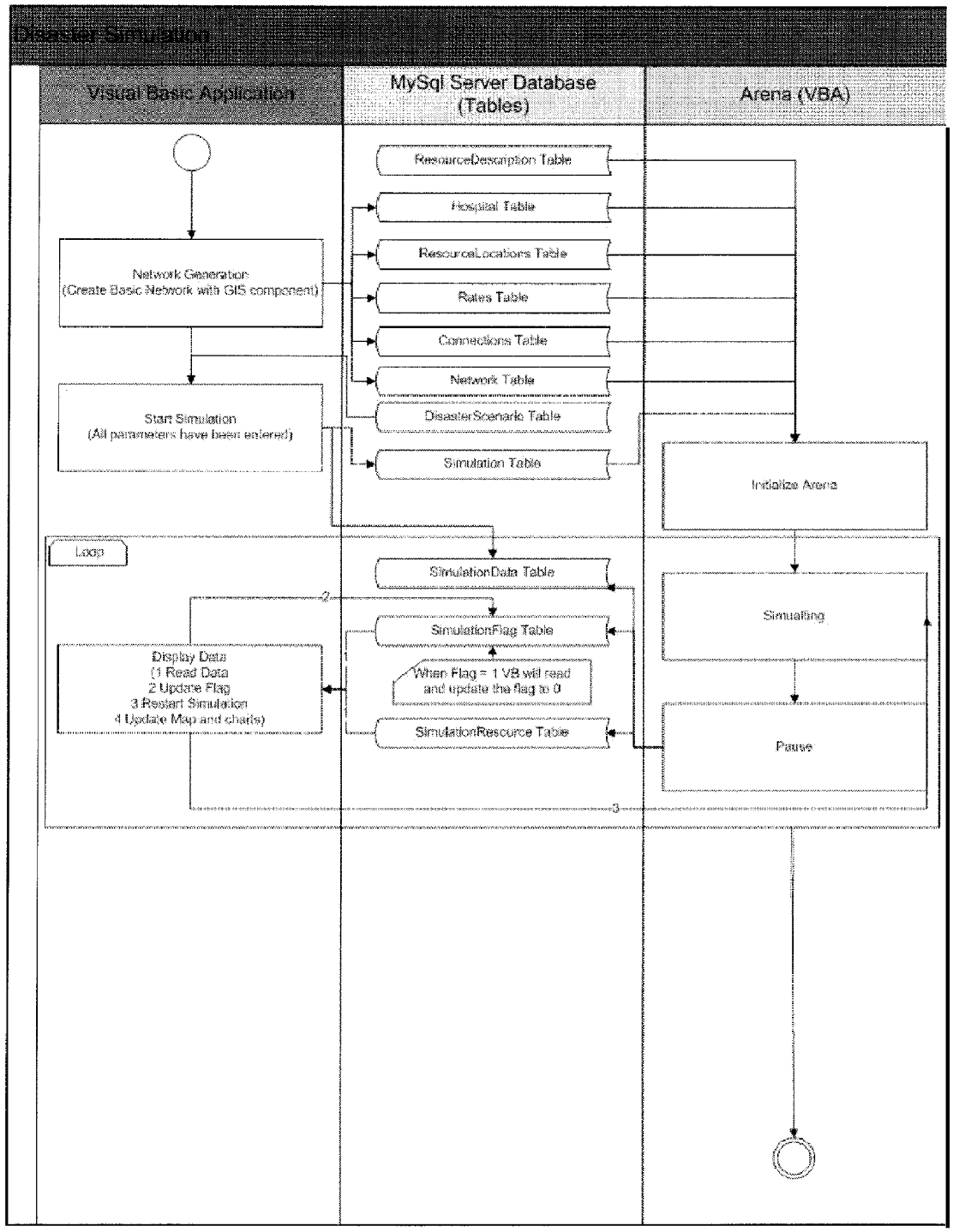
FIG. 15 illustrates an example work flow in accordance with an aspect of the innovation.

An example system work flow is depicted in FIG. 15. The example flow mainly includes three parts: a VB application, an intermediate database and the Arena-brand simulation package. In operation, the VB application initially prepares the data needed for running the simulation such as GIS data and event type and size. The data are stored in relational database. Arena then retrieves those data and runs several replications. Progressive results are collected iteratively and stacked in the database during the simulation run.

Finally, useful results are extracted and complied by the VB application and displayed on the client interface for view and analyses. The simulated results can be affected by dynamic factors such as weather and traffic congestion "on the fly." Some tables of the database that describe the simulation are summarized in Table 3 below.

TABLE 3

Database tables for describing simulation

| Table Name | Contents |
| --- | --- |
| ResourceDescription | Descriptions of emergency resources, e.g., ambulances. |

TABLE 3-continued

Database tables for describing simulation

| Table Name | Contents |
| --- | --- |
| Destinations | The destination points of emergency resources, e.g., hospitals. |
| ResourceLocations | Emergency resource locations. |
| Rates | Emergency vehicle nominal traveling speed. |
| Network | Road network data. |
| Connections | Connectivity of the network. |
| DisasterScenario | Disaster type information. |
| Simulation | Simulation model parameters. |

The innovation's agent-based model comprises of "intelligent" entities that are autonomously controlled by perceiving the surrounding environment, compiling predefined rules that make operational decisions, and acting based on these decisions. Accordingly, the system 100 can simulate complex, dynamic actual systems realistically because their operations are highly analogous. The situation responders simulation primarily deals with a complex network flow problem which involves the responder agents' movement, designated actions decided by a set of rules, and environmental changes caused by victim behaviors, traffic, weather and other factors. An example network comprises of arcs and nodes. Streets, roads and highways are modeled as arcs and their intersections are modeled as nodes. Agents are described by the status attributes attached to them such as trip start node, trip end node, past action and current action.

While an agent performs many different actions, in operation, the system 100 can classify them into three types: (1) traveling from one node to another, (2) staying at one node for some time to perform some tasks such as picking up victims, and (3) stopping at one node until starting up again. A whole event can be divided into and simulated by many discrete consecutive agent actions. After each small agent action, the simulation stops and fires the rule sets in the back to rationally determine what the next action will be based on the surrounding environment and other agents' status. In this manner, the discrete event simulation and agent-based modeling are combined and controlled by rules. The rule sets can be implemented outside of the simulation model and are subject to changes under specific circumstances (e.g., in real-time or near real-time).

In an aspect, the rules are implemented in the format of "what-if" clauses: IF some condition(s) THEN some action(s). As discussed above, an example focuses on implementing emergency medical services (EMS) ambulance rules. Each segment of agent rules has antecedents and consequences as illustrated in Table 4.

TABLE 4

Simple agent rules for EMS ambulance actions

| Antecedents | Consequences | Actions |
| --- | --- | --- |
| <Vehicle-Type Ambulance> <Vehicle-Status Idle> | <Vehicle-Status Emergency> <Vehicle-Destination Emergency-Pickup-Site> | Send idle ambulance to emergency pickup site. |
| <Vehicle-Type Ambulance> <Vehicle-Status Responding> | Nothing | Leave ambulance status and destination unchanged. |

TABLE 4-continued

Simple agent rules for EMS ambulance actions

| Antecedents | Consequences | Actions |
|---|---|---|
| <GreaterThan(Respondance-Severity, Moderate)> <Vehicle-Type Ambulance> <Vehicle-Status Responding> <LessThan(Respondance-Severity, Severe)> | <Vehicle-Status Emergency> <Vehicle-Destination Emergency-Pickup-Site> | Send empty ambulance that was responding to a prior emergency to the emergency pickup site. |
| <Vehicle-Type Ambulance> <Equal(Vehicle-Location, Emergency-Dropoff-Site)> <Equal(Vehicle-Passengers, 0) | <Vehicle-Status Emergency> <Vehicle-Destination Emergency-Pickup-Site> | Send ambulance to emergency pickup site from emergency dropoff site. |
| <Vehicle-Type Ambulance> <Equal(Vehicle-Location, Emergency-Pickup-Site)> <Vehicle-Status Emergency> | <Vehicle-Destination Emergency-Dropoff-Site> <Vehicle-Passengers Min(Victims, Vehicle-Capacity)> | Send ambulance to emergency dropoff site from emergency pickup site. |

Referring to the 4$^{th}$ rule in Table 4 (in bold), the rule says: "After an ambulance takes victims at the emergency drop-off site, it should go back to the pickup site." If the rule engine detects that the agent's type is ambulance, the agent's location equals emergency drop-off site, and the agent is not carrying any passengers, the algorithm will set the agent status as emergency and its destination as the pickup site then the ambulance can return to the pickup site. It is to be understood that the above example is included to provide perspective to the innovation. Accordingly, countless examples exist which are to be included within the scope of the innovation and claims appended hereto.

Visualization is a key feature of the innovation because the innovation can provide incident managers with insightful information about potential of ongoing disaster events and enhance their situational awareness through the system 100. Most emergency incident managers are not simulation or computer experts so a user-friendly interface becomes important if they are to use the system as a management tool. The client interfaces are comprised of two parts: disaster instance generation and result display and analyses (208, 212 respectively). One advantage of the system 100 is that it can generate the simulation model and disaster instances flexibly given the data specified in Table 3 above. Thus, it is highly portable and easy for deployment.

Figure 16:
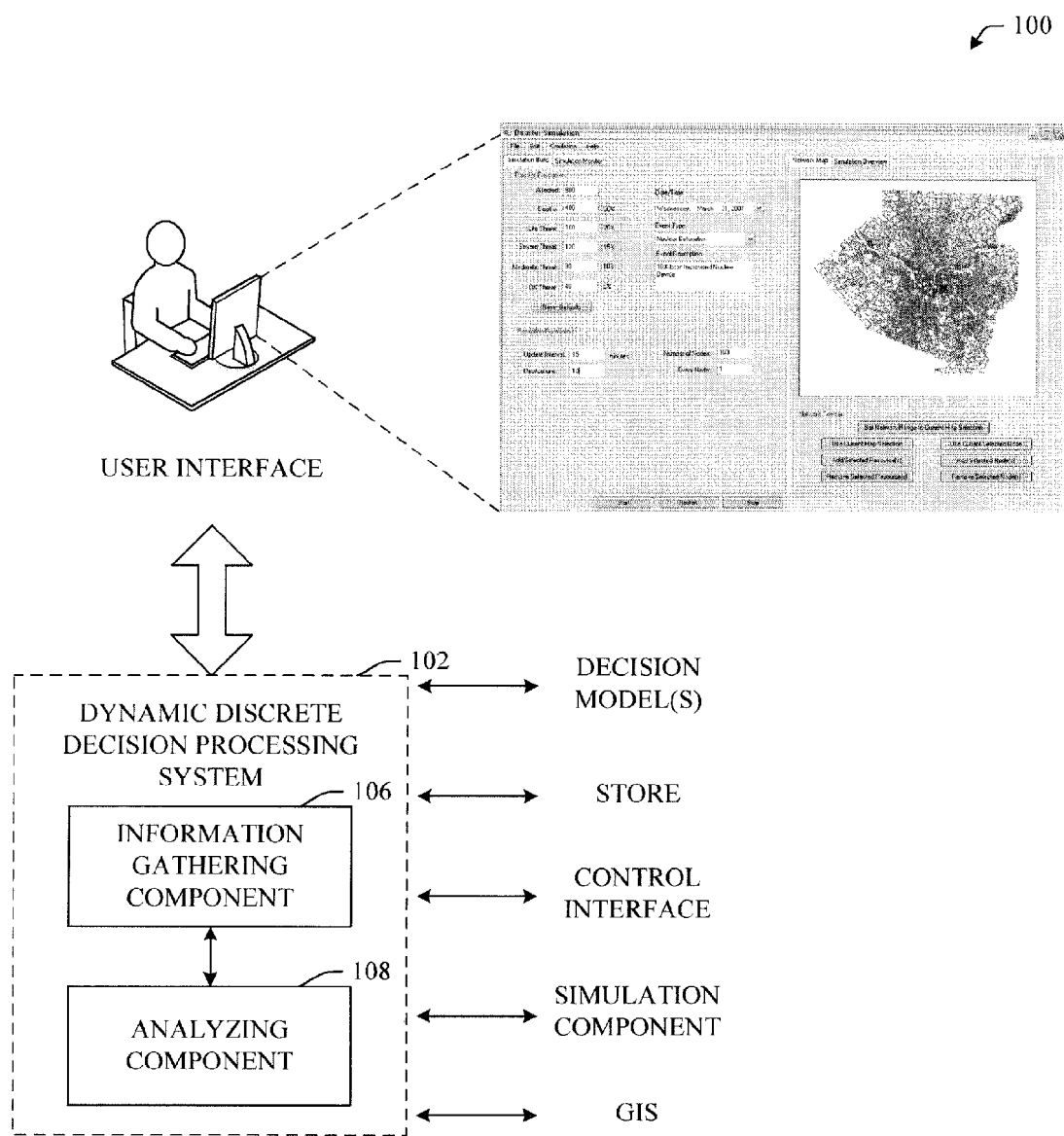
FIG. 16 illustrates an example display of an interface for generating a disaster simulation instance in accordance with an aspect of the innovation.

FIG. 16 illustrates an example display of the interface for generating a disaster simulation instance. In operation, users can choose the disaster type and specify the event size with severity distribution. The simulation network model is generated automatically with the geographical data extracted from GIS.

Figure 17:
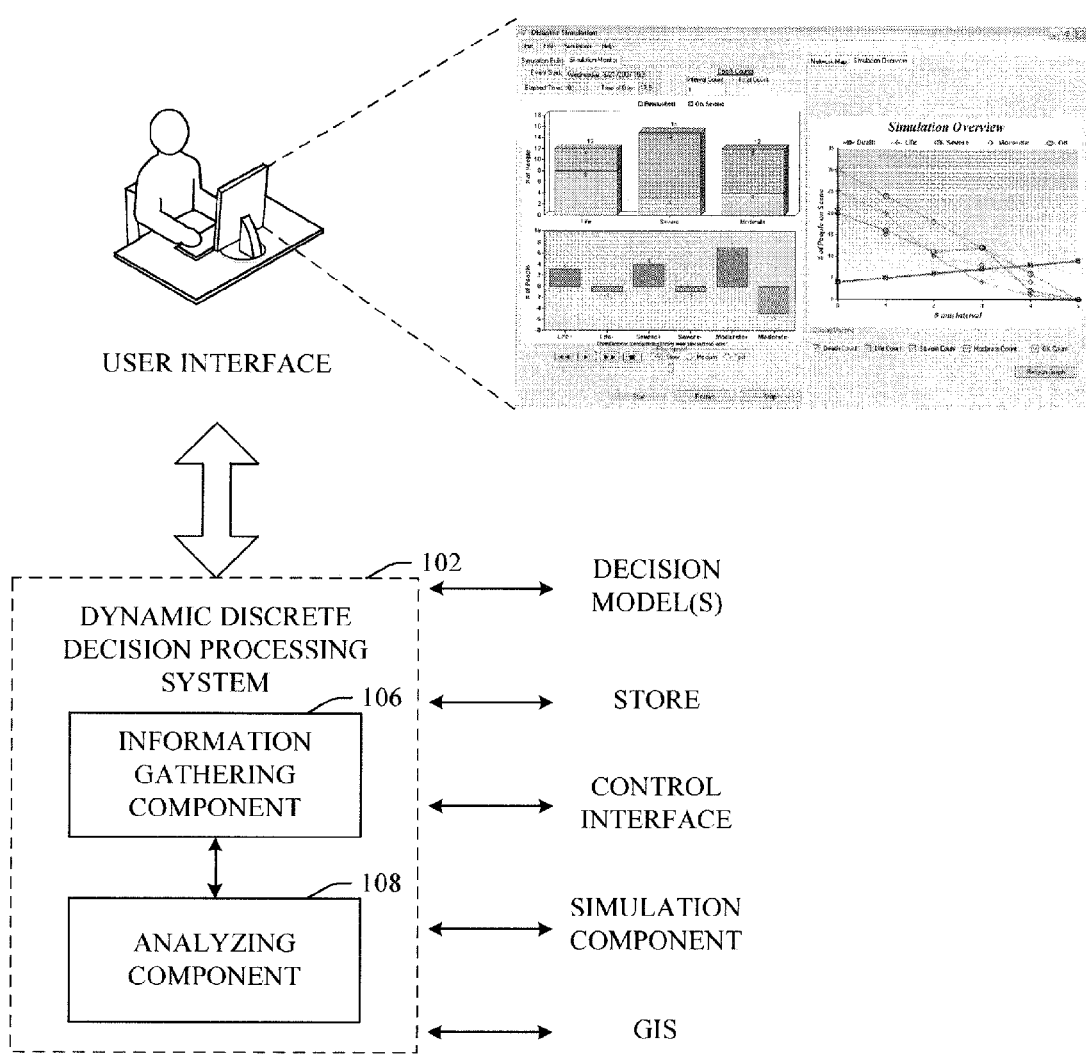
FIG. 17 illustrates an example display of an interface of simulation results in accordance with an aspect of the innovation.

After the simulation run, various resulting charts are displayed on the interface shown in FIG. 17. The charts depict the progressive situations of the event by breaking the results down into consecutive segments. The incident manager can manipulate the rules and parameters and re-run the system to search for management improvements. Moreover, optimization algorithms can be incorporated in the system to automatically search for better solutions.

While many of examples illustrated herein are developed for simulating the EMS system in the Pittsburgh downtown area, it is to be understood that this example is provided to add perspective to the innovation. Accordingly, the innovation can be applied to most any crisis or situation planning, simulation and management without departing from the spirit and/or scope of this disclosure and claims appended hereto.

Following is a discussion of experimentation results employing the innovation. The total evacuation time was evaluated for each experiment. See Table 5 for the results. The total evacuation time increases more and more slowly with the identical increase (e.g., 21) in number of victims. This makes sense because the EMS system needs some time to prepare and start up when it is initially called to respond. After running for a while the system becomes stable and more efficient. When there are 21 victims, the minimal evacuation time appears at Location #18; when there are more than 21 victims (e.g., 42, 63, and 84), minimal evacuation time appears at Location #30 because Location #30 is closer to many city hospitals and is more accessible to emergency resources.

TABLE 5

This table shows the total evacuation time results of 16 simulation experiments conducted at four different locations spreading out in the Pittsburgh downtown area with four scales of disaster incidents.

| | Victim # | | | |
|---|---|---|---|---|
| Location # | 21 | 42 | 63 | 84 |
| 8 | 17.34 | 52.13 | 83.46 | 111.05 |
| 18 | 17.29 | 49.02 | 79.89 | 111.35 |
| 30 | 17.48 | 47.26 | 76.23 | 106.92 |
| 44 | 17.80 | 49.86 | 82.21 | 111.17 |
| Average | 17.48 | 49.57 | 80.45 | 110.12 |

All results are in the unit of minutes.

Following is a discussion of simulating one location with events of different scales in accordance with an aspect of the innovation. The David L. Lawrence Convention Center in the Pittsburgh downtown area is a busy location where a large amount of traffic passes and structures exist. Thus, it is a good place to demonstrate the innovation's capability of simulating various disaster events. Suppose some events with different scales happen in this location and EMS is called to respond to the events. A series of simulations are run to evaluate the scene clearance time and death of victims versus number of victims. The results are fitted and showed in graphs below. It is obvious that break point appears when number of casualties reaches around 330. From this point, the number of deaths increases exponentially. Thus, additional responses are needed to deal with this level of events when resources saturate and traffic is highly congested.

Figure 20:
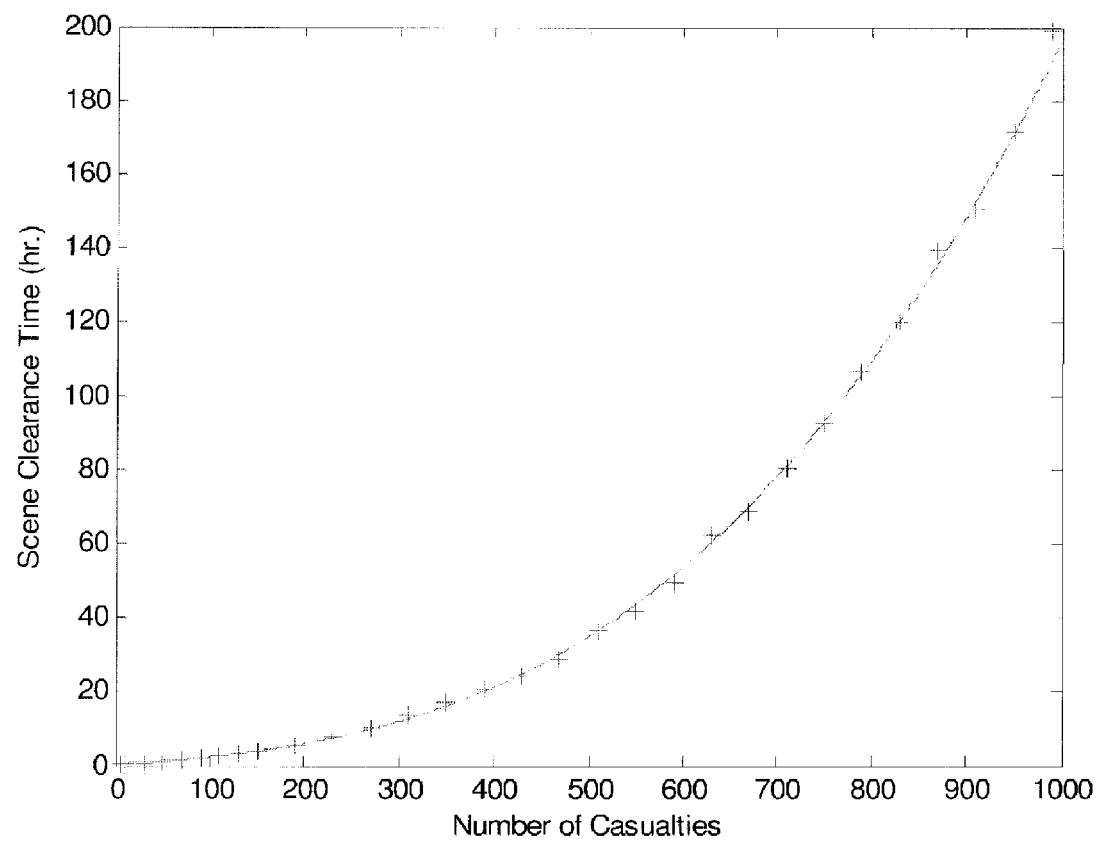
FIG. 20 illustrates an example graph that depicts scene clearance time versus number of casualties.
Figure 21:
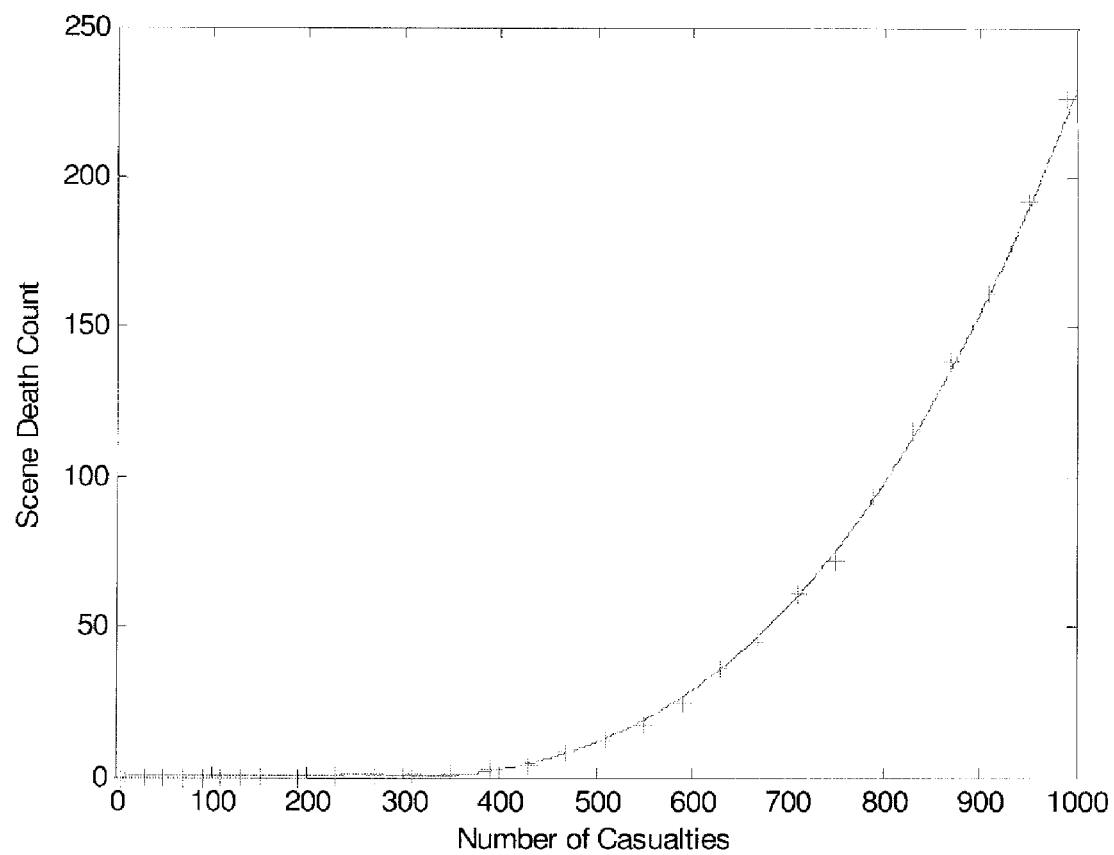
FIG. 21 illustrates an example graph that depicts scene death count versus number of casualties.

Graphs 1(a) (FIG. 20) and 1(b) (FIG. 21): The two charts (a) and (b) are fitted by the results of a simulation experiment conducted at one location (David L. Lawrence Convention Center) in the Pittsburgh downtown area.

As described herein, a key feature, function or benefit of the innovation is to build a comprehensive, interactive, multi-module computer simulation system for testing how the type and scale of the event, situational variables and command decisions affect responders' efficiency and effectiveness in dealing with complex and evolving disasters. Such a system can be of great assistance to emergency officials in managing emerging events.

The discrete event simulation of the innovation is a tool for modeling complex, large-scale systems. As illustrated herein, when combined with agent-based models, it becomes even more powerful because it bears more flexible scalable operational rules and is easier to interface with other modules that can introduce more reality and dynamics into the system.

Figure 18:
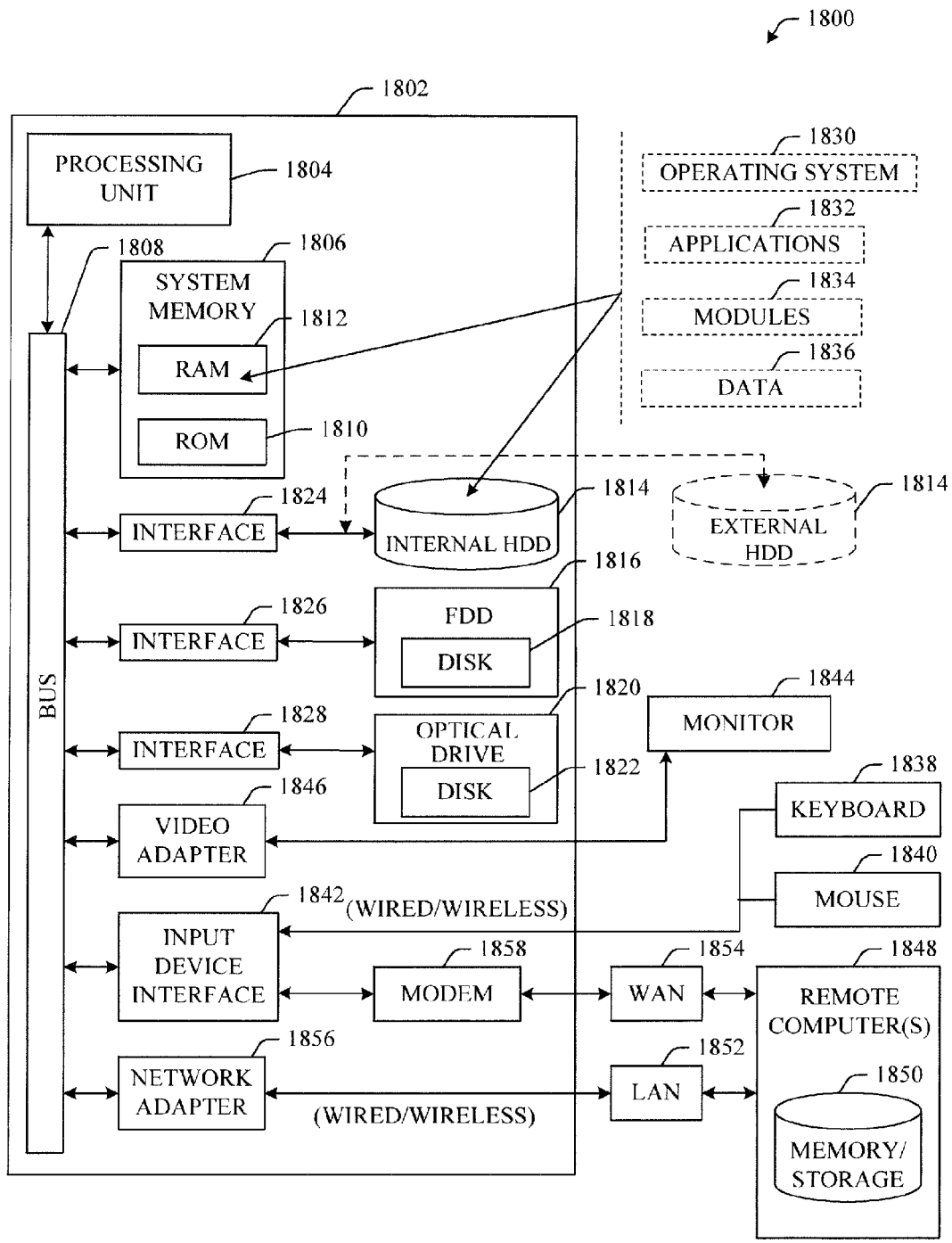
FIG. 18 illustrates a block diagram of a computer operable to execute the disclosed architecture.

Referring now to FIG. 18, there is illustrated a block diagram of a computer operable to execute the disclosed architecture. In order to provide additional context for various aspects of the subject innovation, FIG. 18 and the following discussion are intended to provide a brief, general description of a suitable computing environment 1800 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 18, the exemplary environment 1800 for implementing various aspects of the innovation includes a computer 1802, the computer 1802 including a processing unit 1804, a system memory 1806 and a system bus 1808. The system bus 1808 couples system components including, but not limited to, the system memory 1806 to the processing unit 1804. The processing unit 1804 can be any of various commercially available processors. Dual microprocessors and other multi-processor architectures may also be employed as the processing unit 1804.

The system bus 1808 can be any of several types of bus structure that may further interconnect to a memory bus (with or without a memory controller), a peripheral bus, and a local bus using any of a variety of commercially available bus architectures. The system memory 1806 includes read-only memory (ROM) 1810 and random access memory (RAM) 1812. A basic input/output system (BIOS) is stored in a non-volatile memory 1810 such as ROM, EPROM, EEPROM, which BIOS contains the basic routines that help to transfer information between elements within the computer 1802, such as during start-up. The RAM 1812 can also include a high-speed RAM such as static RAM for caching data.

The computer 1802 further includes an internal hard disk drive (HDD) 1814 (e.g., EIDE, SATA), which internal hard disk drive 1814 may also be configured for external use in a suitable chassis (not shown), a magnetic floppy disk drive (FDD) 1816, (e.g., to read from or write to a removable diskette 1818) and an optical disk drive 1820, (e.g., reading a CD-ROM disk 1822 or, to read from or write to other high capacity optical media such as the DVD). The hard disk drive 1814, magnetic disk drive 1816 and optical disk drive 1820 can be connected to the system bus 1808 by a hard disk drive interface 1824, a magnetic disk drive interface 1826 and an optical drive interface 1828, respectively. The interface 1824 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 1812, including an operating system 1830, one or more application programs 1832, other program modules 1834 and program data 1836. All or portions of the operating system, applications, modules, and/or data can also be cached in the RAM 1812. It is appreciated that the innovation can be implemented with various commercially available operating systems or combinations of operating systems.

A user can enter commands and information into the computer 1802 through one or more wired/wireless input devices, e.g., a keyboard 1838 and a pointing device, such as a mouse 1840. Other input devices (not shown) may include a microphone, an IR remote control, a joystick, a game pad, a stylus pen, touch screen, or the like. These and other input devices are often connected to the processing unit 1804 through an input device interface 1842 that is coupled to the system bus 1808, but can be connected by other interfaces, such as a parallel port, an IEEE 1394 serial port, a game port, a USB port, an IR interface, etc.

A monitor 1844 or other type of display device is also connected to the system bus 1808 via an interface, such as a video adapter 1846. In addition to the monitor 1844, a computer typically includes other peripheral output devices (not shown), such as speakers, printers, etc.

The computer 1802 may operate in a networked environment using logical connections via wired and/or wireless communications to one or more remote computers, such as a remote computer(s) 1848. The remote computer(s) 1848 can be a workstation, a server computer, a router, a personal computer, portable computer, microprocessor-based entertainment appliance, a peer device or other common network node, and typically includes many or all of the elements described relative to the computer 1802, although, for purposes of brevity, only a memory/storage device 1850 is illustrated. The logical connections depicted include wired/wireless connectivity to a local area network (LAN) 1852 and/or larger networks, e.g., a wide area network (WAN) 1854. Such LAN and WAN networking environments are commonplace in offices and companies, and facilitate enterprise-wide computer networks, such as intranets, all of which may connect to a global communications network, e.g., the Internet.

When used in a LAN networking environment, the computer 1802 is connected to the local network 1852 through a wired and/or wireless communication network interface or adapter 1856. The adapter 1856 may facilitate wired or wireless communication to the LAN 1852, which may also include a wireless access point disposed thereon for communicating with the wireless adapter 1856.

When used in a WAN networking environment, the computer 1802 can include a modem 1858, or is connected to a communications server on the WAN 1854, or has other means for establishing communications over the WAN 1854, such as by way of the Internet. The modem 1858, which can be internal or external and a wired or wireless device, is connected to the system bus 1808 via the serial port interface 1842. In a networked environment, program modules depicted relative to the computer 1802, or portions thereof, can be stored in the remote memory/storage device 1850. It will be appreciated that the network connections shown are exemplary and other means of establishing a communications link between the computers can be used.

The computer 1802 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 19:
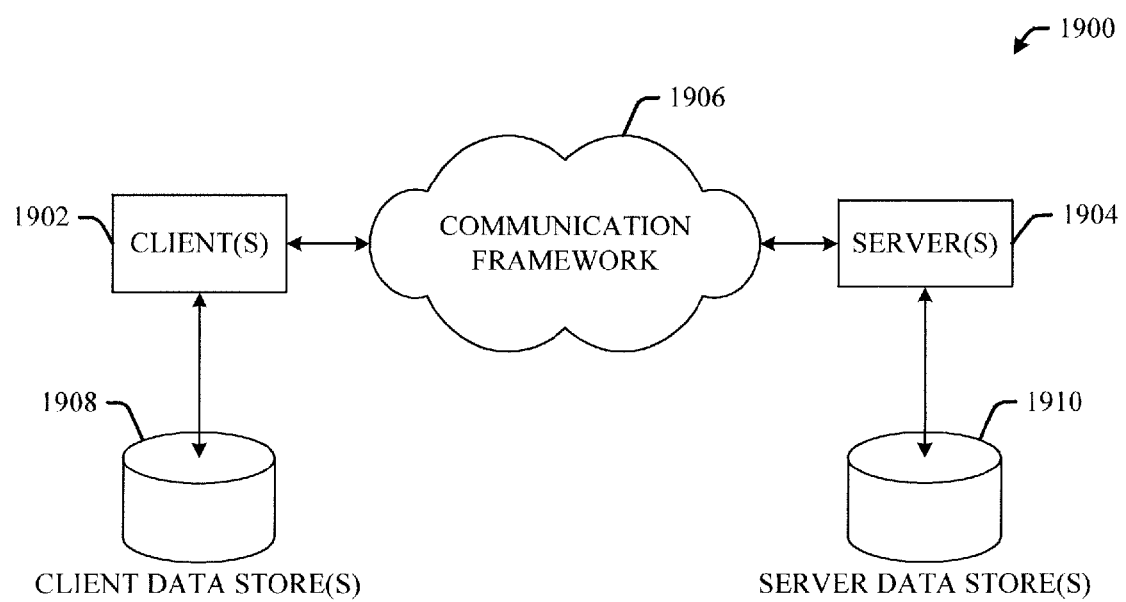
FIG. 19 illustrates a schematic block diagram of an exemplary computing environment in accordance with the subject innovation.

Referring now to FIG. 19, there is illustrated a schematic block diagram of an exemplary computing environment 1900 in accordance with the subject innovation. The system 1900 includes one or more client(s) 1902. The client(s) 1902 can be hardware and/or software (e.g., threads, processes, computing devices). The client(s) 1902 can house cookie(s) and/or associated contextual information by employing the innovation, for example.

The system 1900 also includes one or more server(s) 1904. The server(s) 1904 can also be hardware and/or software (e.g., threads, processes, computing devices). The servers 1904 can house threads to perform transformations by employing the innovation, for example. One possible communication between a client 1902 and a server 1904 can be in the form of a data packet adapted to be transmitted between two or more computer processes. The data packet may include a cookie and/or associated contextual information, for example. The system 1900 includes a communication framework 1906 (e.g., a global communication network such as the Internet) that can be employed to facilitate communications between the client(s) 1902 and the server(s) 1904.

Communications can be facilitated via a wired (including optical fiber) and/or wireless technology. The client(s) 1902 are operatively connected to one or more client data store(s) 1908 that can be employed to store information local to the client(s) 1902 (e.g., cookie(s) and/or associated contextual information). Similarly, the server(s) 1904 are operatively connected to one or more server data store(s) 1910 that can be employed to store information local to the servers 1904.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates dynamic discrete simulation of an event, comprising:
at least one processor coupled to a memory, the processor executing:
an information gathering component that dynamically obtains information from a plurality of agents; and
an analyzer component that evaluates the information and communicates a subset of the information to a subset of the agents, wherein the subset of the agents generates a simulation of the event in real-time based at least in part on the subset of the information, wherein one or more of a plurality of rules are triggered in real-time during the simulation based at least in part on a status of the simulation, and wherein the status of the simulation is changed based at least in part on the plurality of rules.

2. The system of claim 1, wherein the plurality of agents includes a geographical information system (GIS) component, a simulator component, and a decision model component.

3. The system of claim 2, wherein the GIS component provides data associated with at least one of topology, geographic features, transportation routes, buildings, population, or resources that enable generation of the simulation.

4. The system of claim 3, wherein the GIS component renders an interactive map based on the data provided by the GIS component.

5. The system of claim 2, wherein the simulator component employs the decision model to establish a progressive simulation of the event.

6. The system of claim 5, wherein the simulator component employs a network optimization algorithm to construct a node set, connections, and travel rates based on geographical information determined by the GIS component.

7. The system of claim 2, wherein the decision model component implements the plurality of rules to codify at least one of standards, training procedures, best practices, exercises for first responders, exercises for dispatchers, exercises for civilians, research on terrorists or environmental factors.

8. The system of claim 7, wherein at least one of the plurality of rules is determined dynamically based at least in part on the status of the simulation.

9. The system of claim 7, wherein at least one of the plurality of rules is inferred by way of one of an artificial intelligence or a machine learning and reasoning mechanism.

10. The system of claim 7, wherein the decision model component employs an SQL database management system to store and retrieve each of the plurality of rules.

11. The system of claim 1, wherein the event is at least one of a natural disaster, a terrorist event, an accident/event caused by human error or an accident/event caused by mechanical failure, and wherein response to the event is coordinated based at least in part on the simulation.

12. The system of claim 1, further comprising an interface component that enables a user to at least one of configure a subset of the information or view the simulation.

13. The system of claim 1, wherein the information comprises at least one of ad-hoc rules or constraints related to one or more of the plurality of agents.

14. The system of claim 11, wherein a plan is developed based on the plurality of rules, one or more emergency personnel are sent instructions associated with the plan, the subset of the information is updated based at least in part on information received from the one or more emergency personnel, and at least one of the plurality of rules is revised based at least in part on the updated information.

* * * * *